(12) United States Patent
Rausch et al.

(10) Patent No.: US 8,661,065 B2
(45) Date of Patent: Feb. 25, 2014

(54) SYSTEMS AND METHODS FOR PROVIDING A DATA GLOSSARY MANAGEMENT SYSTEM

(75) Inventors: Nancy Anne Rausch, Apex, NC (US); Scott Aron Gidley, Cary, NC (US); Peter Rowland Eastwood, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 13/220,956

(22) Filed: Aug. 30, 2011

(65) Prior Publication Data

US 2013/0054627 A1     Feb. 28, 2013

(51) Int. Cl.
*G06F 7/00* (2006.01)
*G06F 17/30* (2006.01)

(52) U.S. Cl.
USPC .................. 707/803; 707/804; 707/805

(58) Field of Classification Search
USPC .......................... 707/803, 804, 805
See application file for complete search history.

(56) References Cited

U.S. PATENT DOCUMENTS 7,020,869 B2 *   3/2006   Abrari et al. .................. 717/108

OTHER PUBLICATIONS

Kimball, Sean et al., "Architecture Made Easy, Part 11—Data Governance: The New Philosophy of Data Governance," The Data Administration Newsletter, 6 pp. (Sep. 1, 2010).
Leonard, Tim, "Business Glossary: A Key Feature of Informatica PowerCenter Advanced Edition," Informatica Feature Brief, 2 pp. (2010).
IBM, "IBM InfoSphere Business Glossary: Features and benefits," downloaded from http://www-01.ibm.com/software/data/infosphere/business-glossary/features.html?S_CMP on Feb. 16, 2011.

* cited by examiner

*Primary Examiner* — Mariela Reyes
(74) *Attorney, Agent, or Firm* — Kilpatrick Townsend & Stockton LLP

(57) ABSTRACT

Provided is a computer system for translating business information and associating the translated business information with user-defined business terms in a processor executable data management system. The computer system comprises a computer readable storage media for providing a data store and a data management system for execution on one or more data processors for storing information relating to a plurality of user-generated business terms in accordance with a schema. The data management system also includes a user interface engine configured to provide a plurality of user interfaces.

36 Claims, 30 Drawing Sheets

| TEMPLATE ATTRIBUTE TYPES | WHAT THIS TYPE MEANS | EXAMPLE VISUALIZATION FOR THIS ATTRIBUTE DONE BY THE GLOSSARY |
|---|---|---|
| SINGLELINETEXT | THIS TYPE SUPPORTS A SINGLE LINE OF TEXT | Numeric currency in dollars |
| SINGLESELECTLIST | THIS TYPE SUPPORTS A USER INTERFACE WHERE THE USER CAN SELECT ONE VALUE OUT OF A LIST OF VALUES | Development ▽ |
| MULTILINETEXT | THIS TYPE SUPPORTS MULTIPLE LINES OF TEXT THAT THE USER CAN ENTER | shared data, TRADESCHEMA |
| MULTISELECTLIST | THIS TYPE SUPPORTS A USER INTERFACE WHERE THE USER CAN SELECT ONE OR MORE VALUES OUT OF A LIST OF VALUES | ☑ Option 1<br>☑ Option 2<br>☑ Option 3<br>☑ Option 4 |

Fig. 7

Fig. 14   Business User

Fig. 15  Technical User

MATCH TO FIG.18B

MATCH TO FIG. 18A

Attributes:

☐ New Attribute....  ☐ Manage Attributes...

Region:    * Select a region
           ☐ North
           ☑ West
           ☑ East
           ☐ South Change Frequency: Select the change frequency for this item
                  [ Infrequently    ▷ ]

Pattern:   * What pattern is appropriate? Example: (<area code>)<3 numbers>-<4numbers>
             or <first name>.<last name>@<company name>.com
           [ <Some default value will go into here > ]

Field Length: Specify the maximum length
              [ 200 ]

☐ Futures Trade ☒

▷ | ✎ Edit... | △ ☐ Monitor 2002 2003 2004 200

Notes: Notional amount of traded contracts in the absolute terms capitalization of equity markets in Australia for October 2006 is funds. We only consider the stock market capitalization of country options in Chicago and stock index futures in the New York have Source: Federation of Euro-Asian Exchanges, World Federation

- Easily lookup terms from other documents and reports
- Quickly understand business meaning, and technical details

| Summary | Reference Data | Data | Quality | Status | History |

Description: «
A single derivative trade of an asset at the specified price and quantity.

Requirements: «
An individual trade must not exceed $1 million. Total trades in a day must not exceed 10% of all futures currently held. Values should be calculated in dollars and converted as needed from other currencies.

Attributes: «
Quality Level: Development
Region: France, Germany, Italy, United States
Data Type: Numeric currency in dollars
Storage: Oracle, shared data, TRADESCHEMA

Details «
Importance: High ★★★☆☆
Language: English

Links «
⊞ Futures Derivative Sales Requirements

Tags «
⌀ Financial
⌀ Trading

Related Terms «
☐ Stock Trade

*Fig. 26*

SYSTEMS AND METHODS FOR PROVIDING A DATA GLOSSARY MANAGEMENT SYSTEM

TECHNICAL FIELD

The technology described herein relates generally to data management systems and more specifically to data management systems that allow users to define terms and associate data to the defined terms.

BACKGROUND

Information in a company is spread across many documents such as spreadsheets, text documents, various internal web sites, people's specific notes and memory, and places. This information represents a collection of knowledge from different contributors and different roles across an enterprise that can be shared, distributed, applied, and monitored. Businesses can benefit from monitoring the quality of data, applying consistent rules to its data, understanding the various business processes that relate to the data, understanding the jobs that are related, and understanding how its business information is interrelated.

SUMMARY

In accordance with the teachings provided herein, systems and methods are provided for a business data glossary which supports the ability to both store and apply the knowledge related and stored in data to the underlying technologies that implement it. Being able to apply the glossary to technology allows an enterprise to reuse, manage, and report on the use of this knowledge across its data and processes.

In accordance with the teachings herein provided is a computer system for translating business information and associating the translated business information with user-defined business terms in a processor executable data management system, the computer system comprising a computer readable storage media for providing a data store; and a data management system for execution on one or more data processors for storing information relating to a plurality of user-generated business terms in accordance with a schema, the data management system including a user interface engine configured to provide a plurality of user interfaces.

BRIEF DESCRIPTION OF THE DRAWINGS

FIG. 7 is a diagram depicting template types that are supported by the example glossary.

FIG. 14 is a diagram depicting an example illustration of the components of the user interface associated with the information stored in a glossary term that are tailored to the business user.

FIG. 15 is a diagram depicting an example illustration of components of a user interface for a technical user.

FIGS. 18A and 18B are diagrams depicting a template of physical information that a technical user can enter to represent terms.

FIG. 23 is a diagram depicting an example visualization of a grouping mechanism available in the glossary, called tags.

FIG. 26 is a diagram depicting a lookup application layer interface into the glossary that can be provided by the glossary architecture.

DETAILED DESCRIPTION

Figure 1:
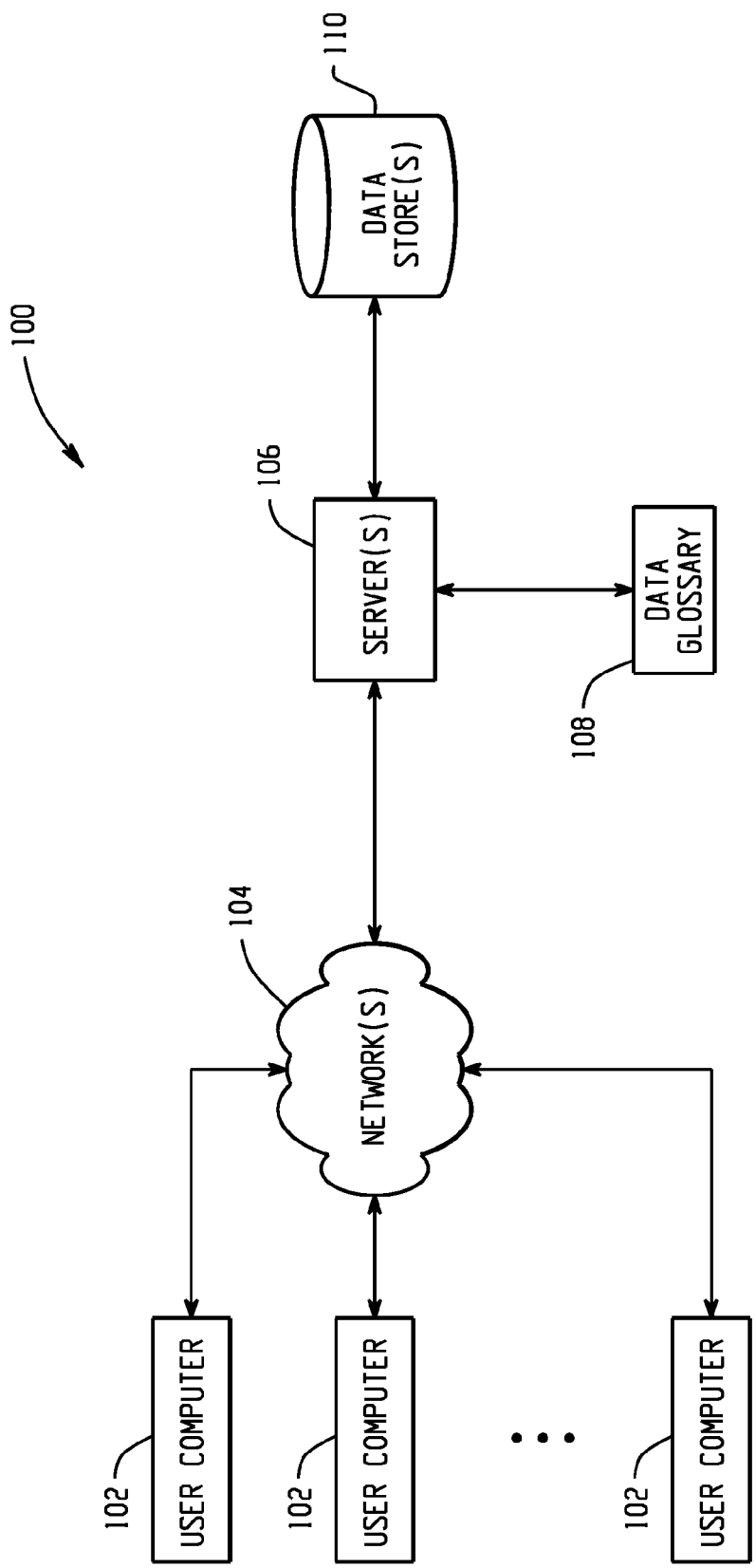
FIG. 1 is a block diagram depicting a computing environment for translating business information and associating the translated business information with user-defined business terms in a processor-executable data management system.

FIG. 1 depicts at 100 a computing environment for translating business information and associating the translated business information with user-defined business terms in a processor-executable data management system. In the illustrated environment, one or more user computers 102 are provided for communication over one or more networks 104 with one or more server computers 106 that host a data glossary system 108. In the illustrated system, one or more data stores 110 are coupled to the server computers 106 to store data to be processed by the data glossary system 108 as well as to store any intermediate or final data generated by the data glossary system 108.

The example data glossary system (also called business data glossary, glossary, business data network, BDN or BDG) comprises a repository of business terms and other information related to business terms that are used throughout a business enterprise. The BDG provides a collection of key business terms and their related data that describe how data in an enterprise is collected, stored, related, cleansed, processed, and audited. The BDG collects business, operational, and technical level metadata that describes the business terms. The business terms stored in the glossary provide a way to relate logical knowledge and physical information together in a cohesive dictionary. This dictionary can be applied and related in various ways to the underlying technologies to support standardization and reuse of data and business knowledge, as well as monitoring and reporting on how well the data in a business matches the standards, rules and other information.

Figure 2:
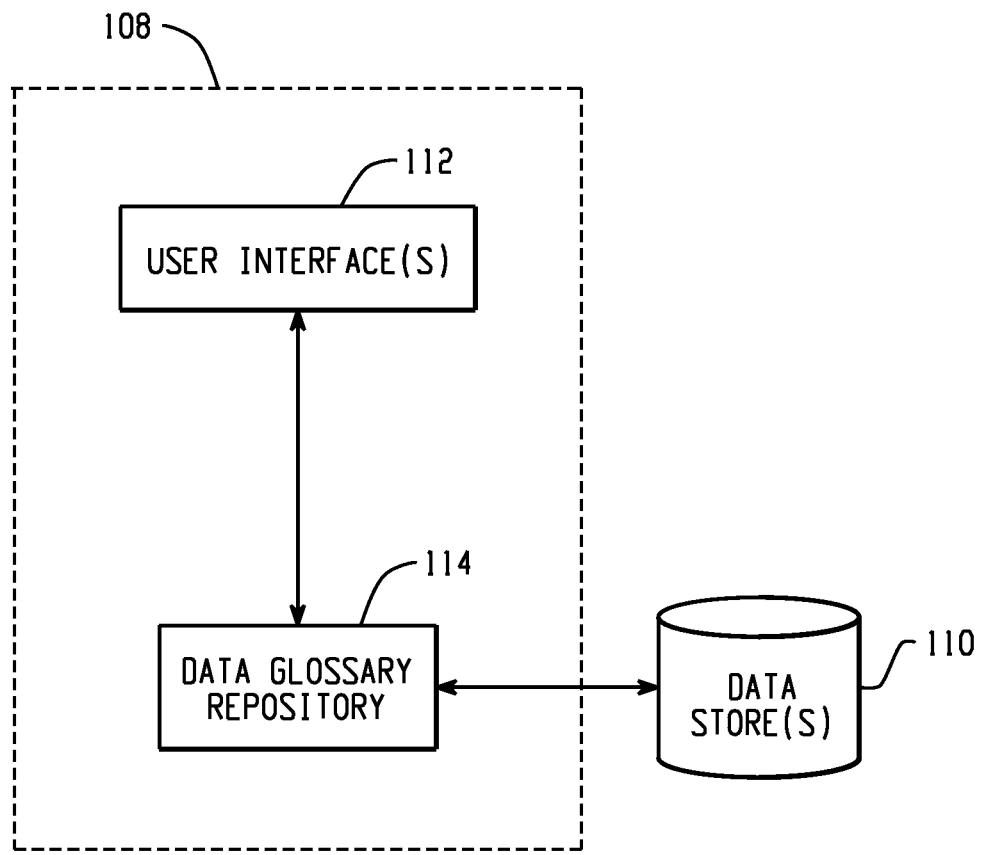
FIG. 2 is a block diagram depicting an example processor-executable data glossary system.

FIG. 2 depicts at 108 an example processor-executable data glossary system. The example data glossary system 108 includes one or more user interface(s) 112 and a data management component or repository 114 of the data glossary system 108. The example data glossary system 108 is executable on one or more data processors and can process and store data on one or more data stores 110 accessible by the data processors. The illustrated user interface 112 is customizable and provided, among other things, for creating the content and displaying the content in the glossary in a way that makes sense for each of a number of user personas. The glossary repository 114 is provided, among other things, for storing and sharing information contained across the business.

Figure 3:
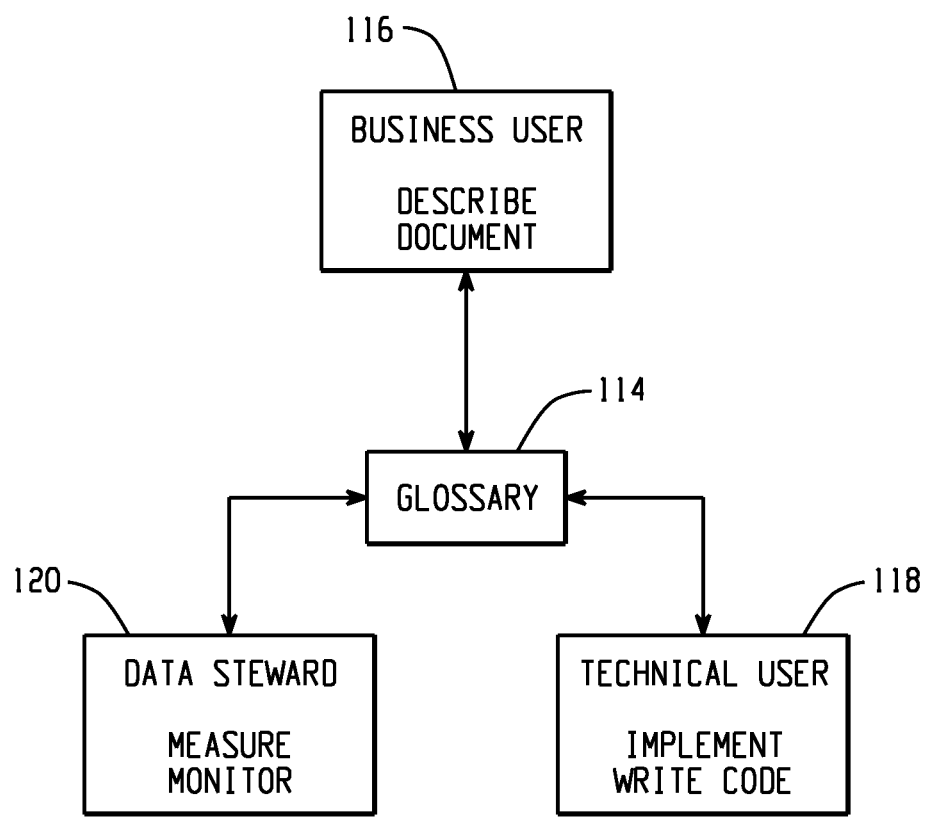
FIG. 3 is a block diagram depicting three example user interfaces that can be implemented to provide user access to the data glossary repository.

FIG. 3 depicts three example user interfaces 116, 118 and 120 that can be implemented to provide user access to information stored in the data glossary repository 114. The three user interfaces shown are a business user interface 116, a technical user interface 118, and a data steward interface 120. Each of these interfaces provides access for a different type of user to the data glossary repository 114 for various tasks associated with business terms.

The three example user interfaces 116, 118 and 120 correspond to three key user personas that have features and components tailored to their needs in the glossary. These three personas—business user, technical user, and data steward—are typical of those members of a business enterprise that typically work with data and are responsible for managing it. The business user 116 typically has responsibility for describing and documenting terms that have some meaning in their business. A business user will do this so that other users will understand the terms. The technical user 118 typically reads and understands the terms, writes code to implement the terms, and applies data to the terms so that data in a business can be tracked by terms in the business. The technical user may also write code, existing rules, or programs to clean data based on the standards that the business user has established for the term, audit data for reporting purposes, and ensure that the data meets the applicable standards. The data steward 120 typically uses the glossary and the underlying technologies to which it is applied to monitor the data according to the applicable standards and understand the rules regarding how to correct the data when it violates established rules and standards. The glossary can meet the needs of these three personas in an enterprise by enabling the three personas to collaboratively store business knowledge, relate the business knowledge to business data, monitor the data for conformance with established rules and standards, and to share business knowledge with others in the enterprise.

Figure 4:
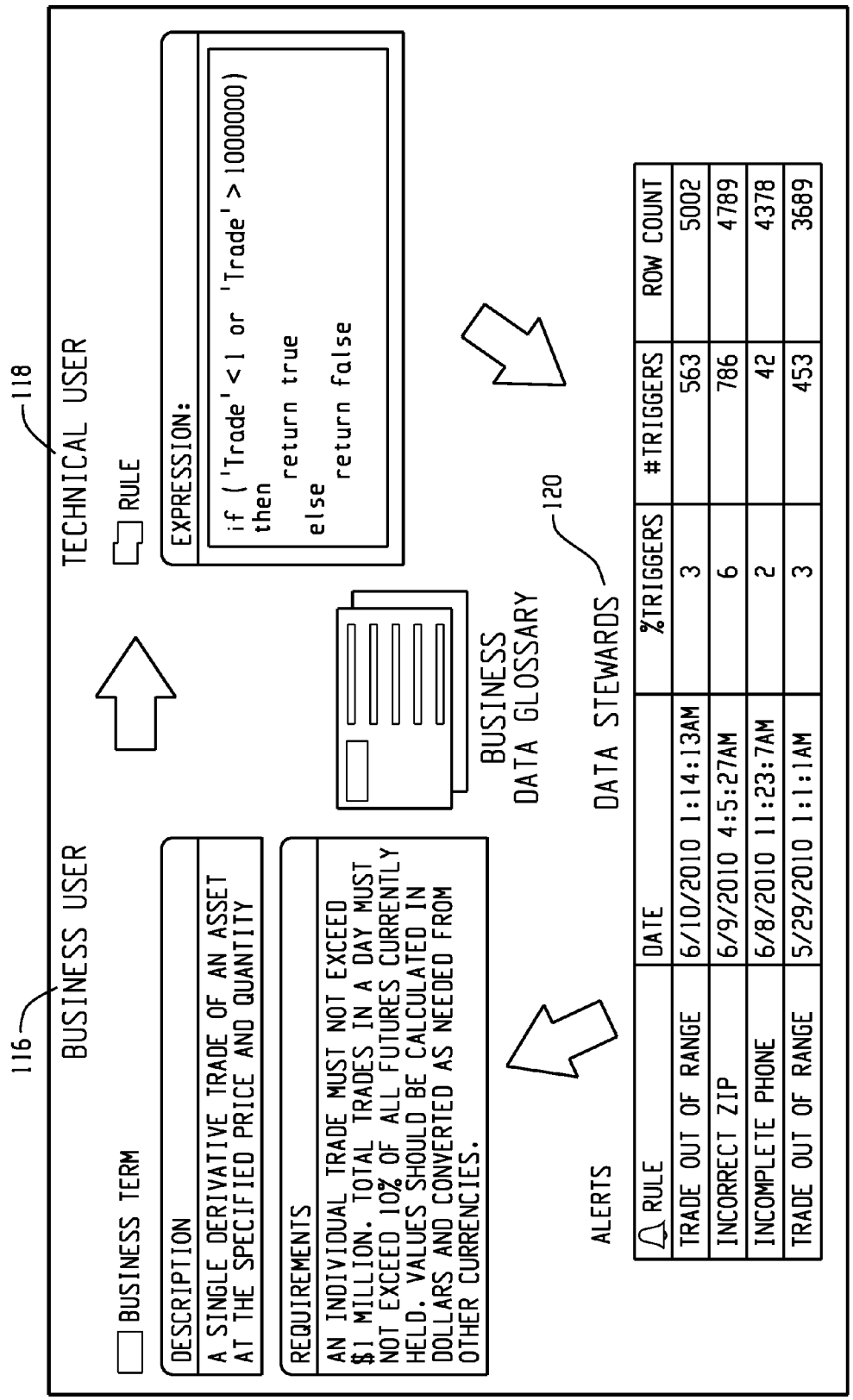
FIG. 4 is a diagram depicting an example of the types of persona specific user interfaces that can be displayed from the glossary.

Depicted in FIG. 4 is an example of the types of persona specific user interfaces that are provided with the glossary. In the example of FIG. 4, the business user's interface 116 allows the business user to describe business terms and requirements relating to the business terms. The technical user will have access to this information and can use it to code rules that describe how to transform data to meet the requirements. A user interface 118 for a technical user is provided that allows a technical user to code rules and tie the coded rules to terms. The code associated to the rules is also available to others who may view the term. The data steward has access to the information provided by the business user as well as the information provided by the technical user and also has access for monitoring data that has been processed with the coded data rules. The data steward is able to associate problems in the data with specific business terms and monitor how the data in an enterprise performs. The business user and technical user also have access to this shared information and can correct or add details, tie additional data sources, and share information through the glossary.

In the example provided in FIG. 4, the business user has defined a business term, provided a description for the term, and provided data requirements for the term. The technical user has coded a rule for the term based on the description and requirements provided by the business user. The data steward monitors compliance of data associated with the term to the rules setup by the technical user and the requirements identified by the business user.

Figure 5A:
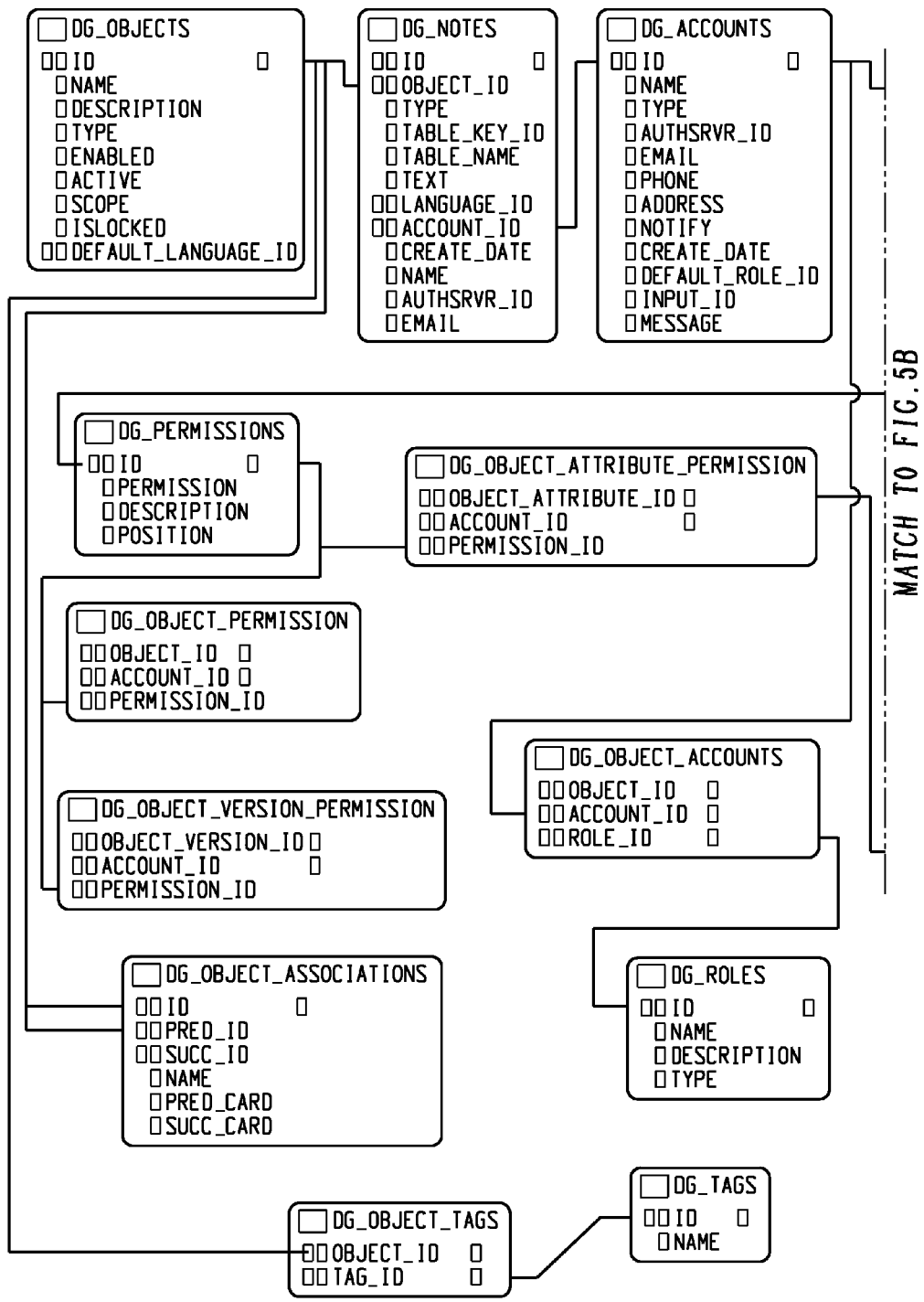
FIGS. 5A-5C are diagrams depicting an example schema that can be used for storing the data in the glossary using various standard databases.
Figure 5B:
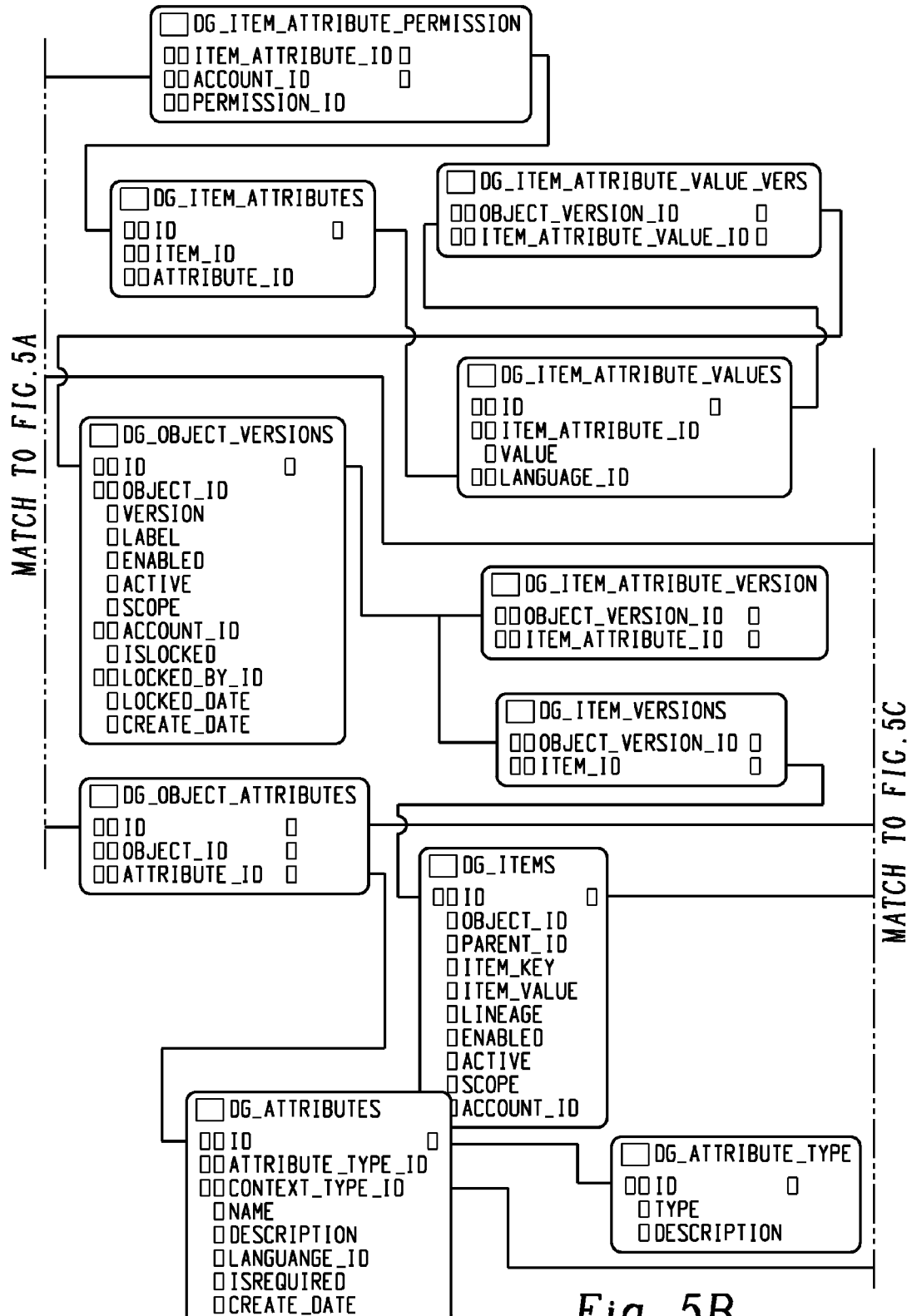
Figure 5C:
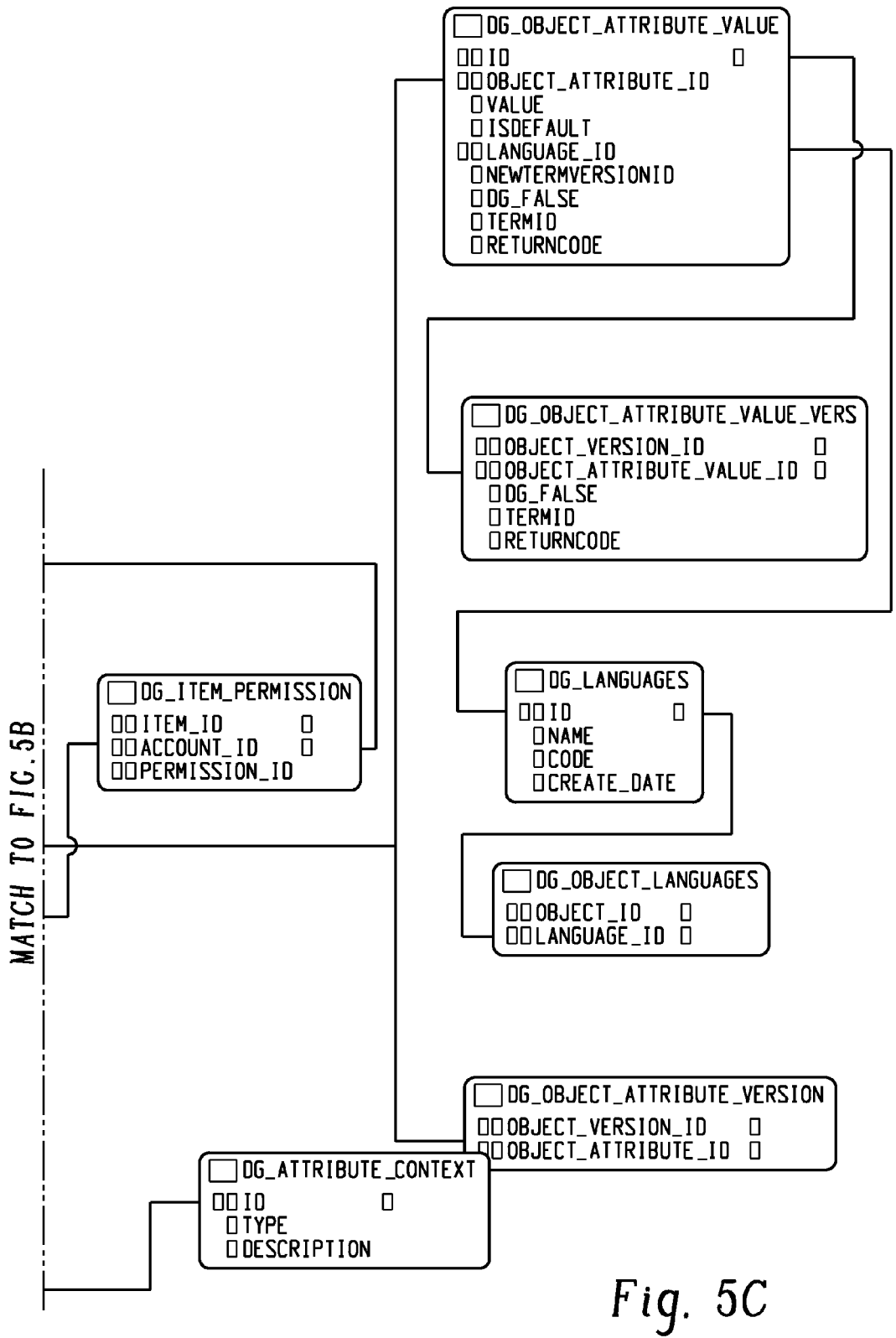

The data repository can be implemented using standard databases. Depicted in FIGS. 5A-5C is an example schema that can be used for storing the data in the glossary using various standard databases. This example schema is specifically optimized to store the information in the glossary for fast and efficient performance.

A business term is the most basic entity used in a glossary. A business term can contain a set of basic attributes (for example name, description, and others), additional user defined and/or site identified key basic attributes, and a set of associations to other content that can contain anything that a user believes needs to be related to the term. A set of basic attributes and relationships are provided with the glossary to cover most general scenarios, and extension capabilities are provided so that users can customize the glossary to their needs.

Figure 6:
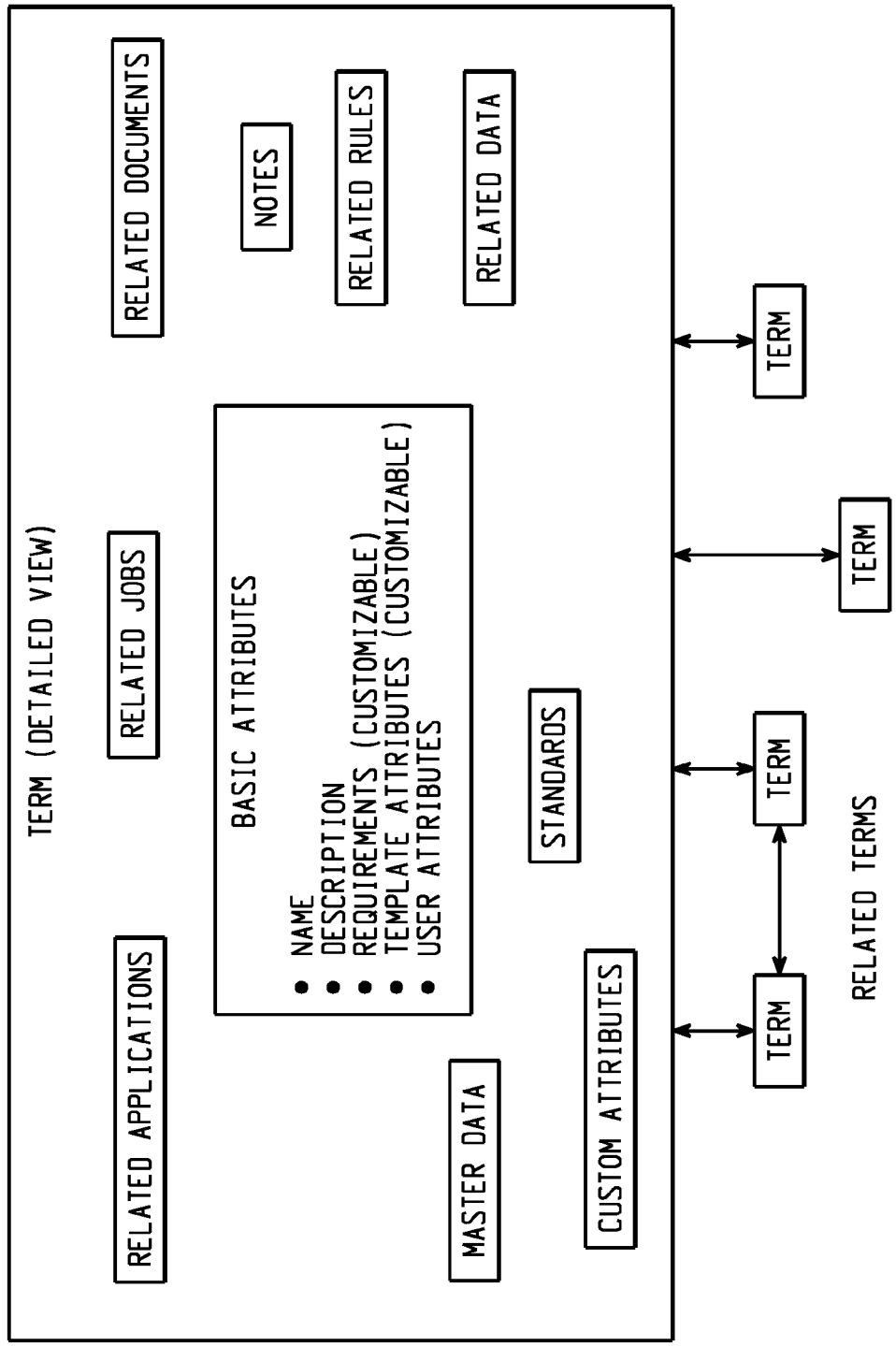
FIG. 6 is a diagram depicting a set of attributes for an example term.

Depicted in FIG. 6 are a set of attributes for an example term. The attributes shown include basic attributes for a term and attributes for identifying related documents, notes, standards, related data, master data, related rules, related applications, related jobs, related terms, and custom attributes.

In this example, the set of basic attributes include a name attribute (used for specifying the name of the term), a description attribute (used for providing general descriptive information regarding the term), and a requirements attribute (used for specifying general requirements that a user of the glossary believes are needed when data is associated with this term). Examples of the requirement attribute can include requirements such as "data cannot be null", "term must be audited" and other concepts that document what this term means and how it is used within a business.

Template attributes can also be included in the basic set of attributes. These are attributes that can be customized by a business site and can be used by the site to more fully describe a term. These are attributes that all terms can inherit. Examples of template attributes may include attributes such as an importance attribute (for identifying how important this term is to the business), a status attribute (for example for identifying if the term is under development or is in production), an owners attribute (for identifying who is responsible for contributing information or using the information in the term), and other attributes that describe the term.

In addition to the basic attributes, other attributes provided for a term may include a related documents attribute. This attribute may provide a pointer to additional documentation, standards, audit information, definitions, and other information that describes a term.

Also illustrated for the example term is a notes attribute. The notes attribute can be provided to allow users to share information regarding the term via notes.

A standards attribute has been included for the example term. The standards attribute can be used to identify standards that must be applied to data associated with this term or that others can share and utilize when working with data associated with the term.

A related data attribute has been included for the example term. The related data attribute can be used to identify data in the business that implements or otherwise is related to this term.

A master data attribute has been included for the example term. The master data attribute can be used to identify data in a system that can be used as a model for what one would expect incoming data to mimic or be transformed into. The master data attribute may also identify data that may be used as a reference for indicating valid values.

A related rules attribute has been included for the example term. The related rules attribute can be used to identify rules and code that have been developed to work with the term, or that can be shared when others need to work with this term.

A related applications attribute has been included for the example term. The related applications attribute can be used to identify applications that might use this term or would leverage this term in the applications. This attribute may also be used for tracking how the applications in a business are related to data.

A related jobs attribute has been included for the example term. This attribute can be used to identify jobs or other processes that interact with this term either for cleansing data associated with the term or managing the business processes associated with the term.

A related terms attribute has been included for the example term. This attribute can be used to identify other terms in a system that are related to the example term. This attribute may also be used to document how the business and technical content in a business interrelate.

Finally, a custom attribute has been provided for the example term. With the custom attribute, a user can add a number of additional custom attributes as needed to fully document and manage the business term.

Not all of the attributes need to be utilized for a term. In the example data glossary system a user can customize the order the attributes are to be displayed and also customize the attributes to add additional information as needed. Also, in the example data glossary system, the attribute settings are stored in the custom schema developed for the glossary as illustrated in the example schema shown in FIGS. 5A-5C.

As discussed above, template attributes are included in the example data glossary system. These attributes can be customized at a business site. Depicted in FIG. 7 are template types that are supported by the example glossary. Shown are four available template attribute types: (i) a single-line text attribute type; (ii) a single-select list attribute type; (iii) a multi-line text attribute type; and (iv) a multi-select list attribute type. As illustrated in FIG. 7, the glossary user interface has a specific visualization for each of these four template attribute types.

In the glossary, template attributes may have additional settings, such as a REQUIRED or NOT REQUIRED setting. A REQUIRED setting may mandate that a value is entered for the attribute whereas a NOT REQUIRED setting suggests that entering a value is optional. Template attributes may also have a default value supplied. When a default value is supplied, the user interface will display that default value for the term. The default value for the attribute may be overridden when needed.

Figure 8:
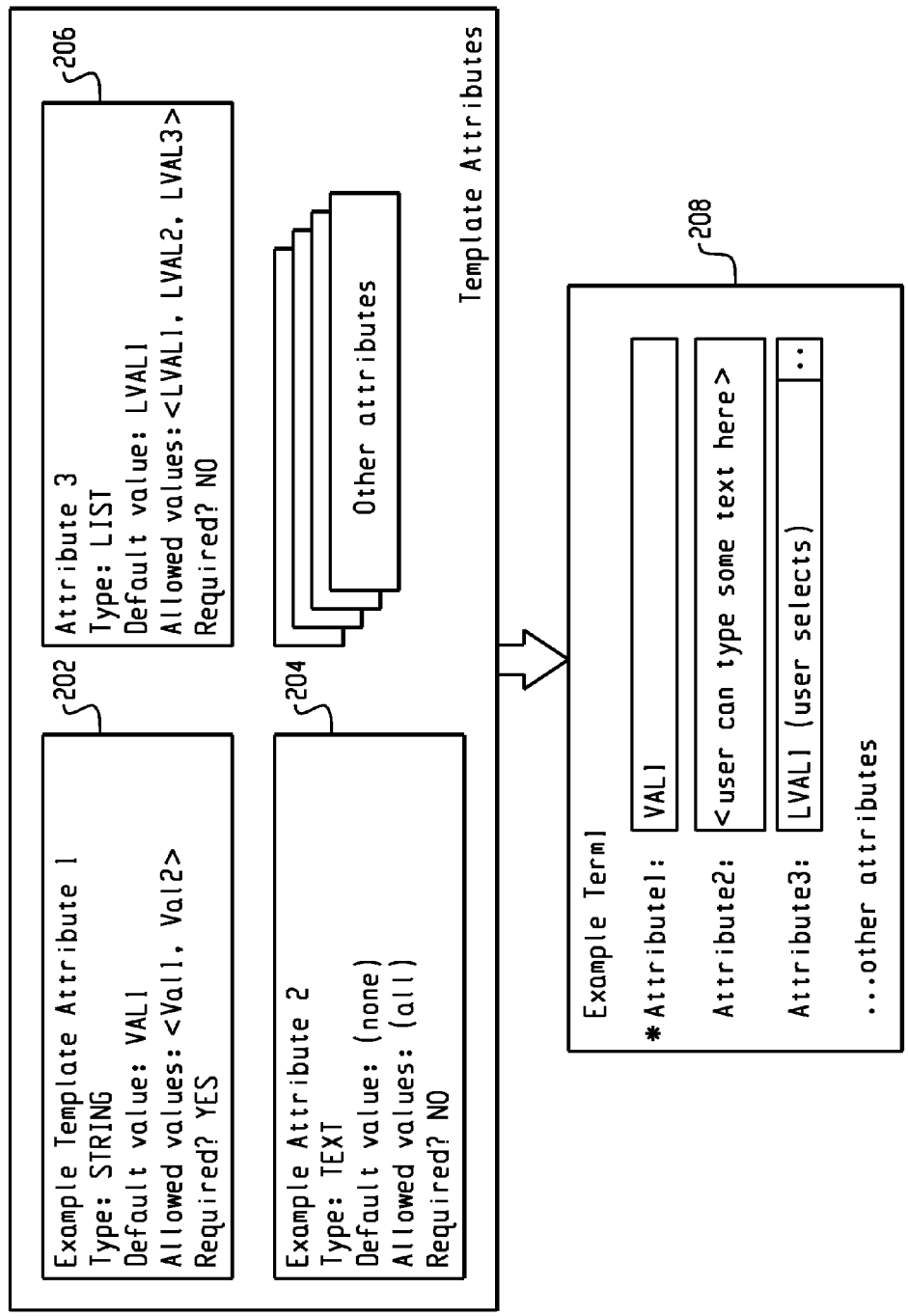
FIG. 8 is a diagram depicting an example use of a set of template attributes for a glossary term.

Depicted in FIG. 8 is an example illustrating the display and use of a template set of attributes for a term in the glossary. In this example, three different attribute types 202, 204, 206 have been defined for customizing the glossary for site specific needs. In the example, the example term 208 inherits these three template attributes. When viewing or editing terms, each of these three template attributes will be displayed via the user interface. As shown at 208 in this example, a single-line text attribute type, with a default value is provided for template attribute 1, a multi-line text attribute type is provided for template attribute 2, and a single-select list attribute type is provided for template attribute 3.

In addition to serving as a repository of information for sharing and exchanging technology and information about the terms in a business, the knowledge contained in the glossary content can be used to generate processes and rules that can be used to standardize data associated with glossary terms. Information can be added to the glossary that describes how to clean and standardize data associated to the glossary term. This information can be entered by the business user in the requirements section (data associated with the term cannot be null or other basic business rules) or by a technical user in the form of algorithms or code that could be used to modify data to meet the standards associated to the term.

Figure 9:
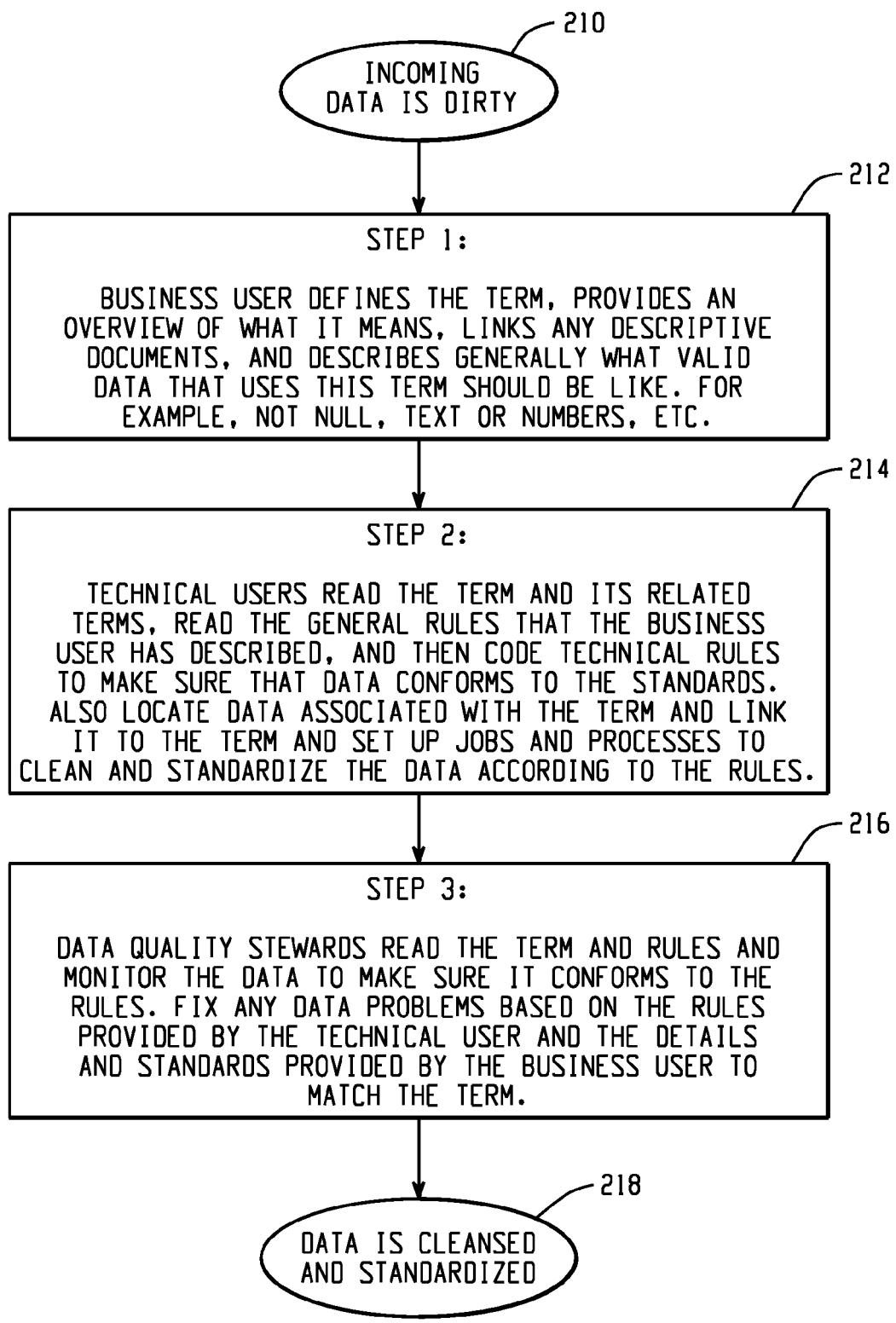
FIG. 9 is a process flow diagram that illustrates an example workflow associated with defining and interacting with a term in the glossary for personas that use the glossary.

Depicted in FIG. 9 is a flow chart that illustrates an exemplary workflow associated with defining and interacting with a term in the glossary for personas that use the glossary. In the example workflow, the business user is responsible for defining the term and associating business information with it (Step 212). The technical user then adds rules, code, algorithms, and other details associated with the content that supports the details provided by the business user (Step 214). The data quality steward then reads the information provided by the two other personas to understand how to interpret the data and monitor it for correctness (Step 216). As a result of implementing this example workflow, incoming data that was dirty (Step 210) can be cleansed and standardized (Step 218).

Figure 10:
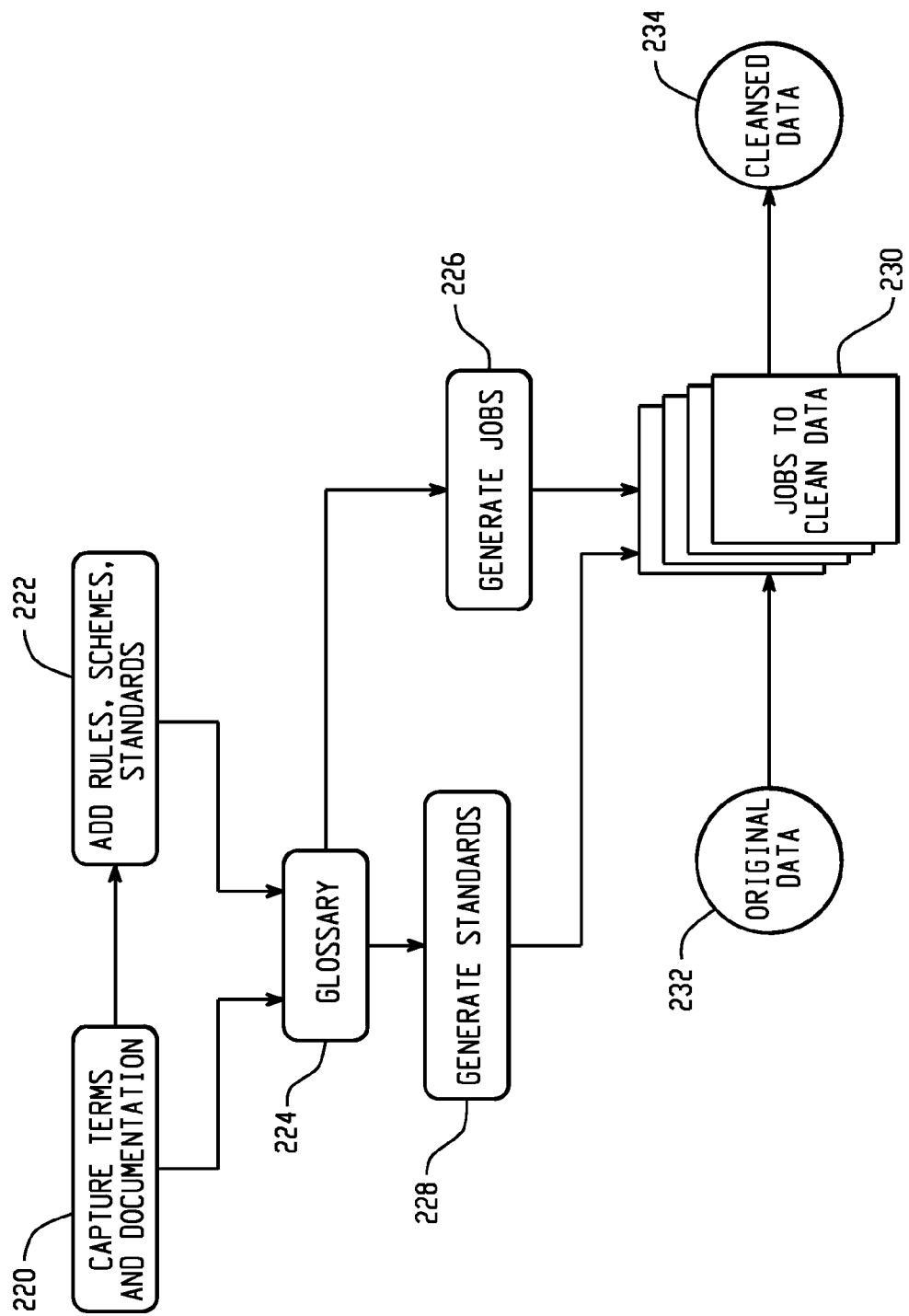
FIG. 10 is a process flow diagram depicting an example process for cleansing data.

Depicted in FIG. 10 is a flow diagram that illustrates an example process for cleansing data. First, terms and documentation relating to the terms (220) and rules, schemes, standards relating to the terms (222) are entered into the Glossary repository (224). After the glossary term is built out with the necessary details on what is considered valid data and standards for data associated with a glossary term, an action in the glossary user interface can be taken to generate jobs (226) and standards (228) to apply to jobs (230). These jobs (230) can then be used to massage incoming data (232) to meet the standards associated with the term to generate cleansed data (234).

Figure 11:
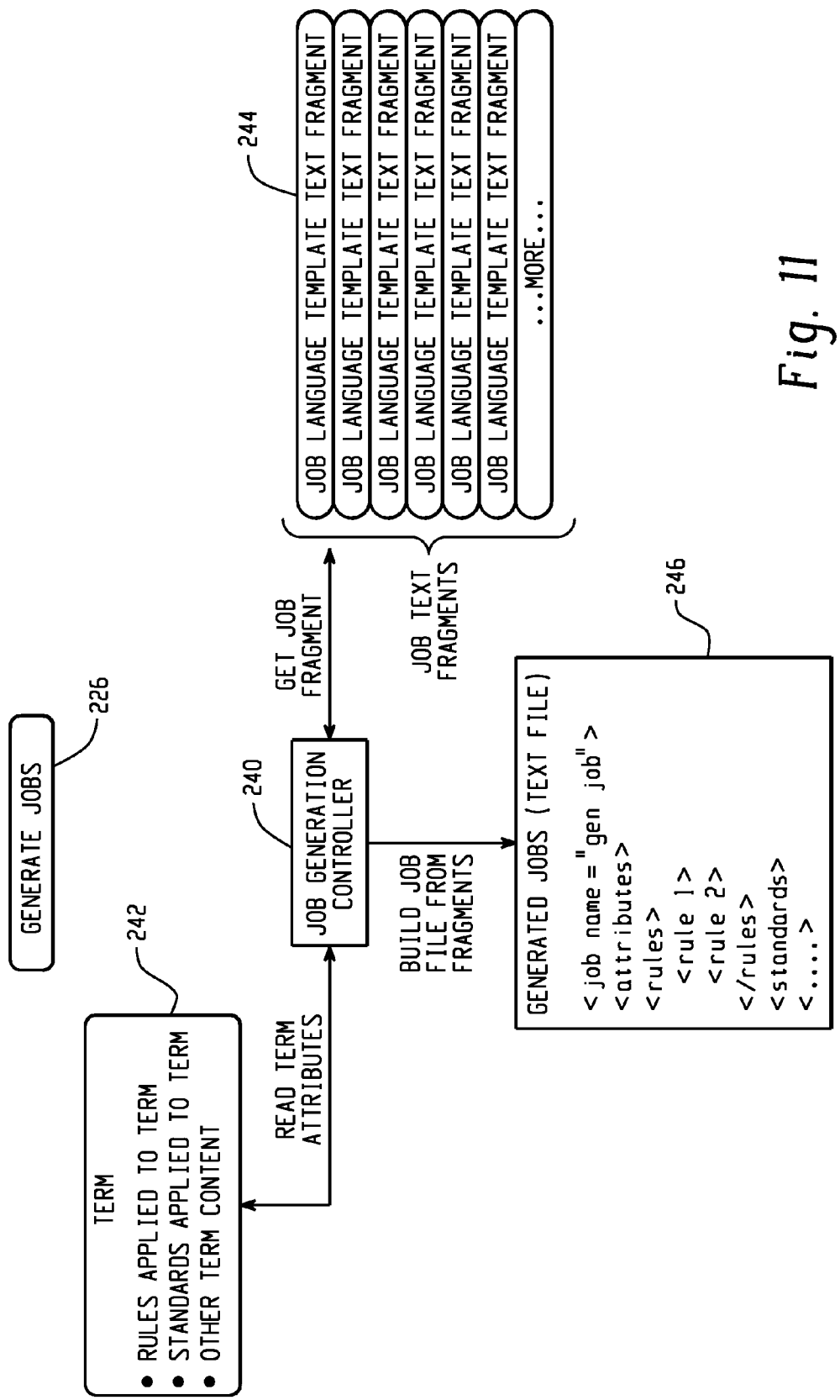
FIG. 11 is a process flow diagram depicting an example process for generating jobs.

Depicted in FIG. 11 is flow diagram illustrating an example process for generating jobs (226). A job generation controller 240 reads the information (242) stored in the glossary relating to a term such as rules, schemes, and scripts that have been associated to the term. The job controller 240 has access to a library of job script templates 244 that provide the rules and schemes for the generation of a job. For each rule or scheme that is associated to the term there are 1–N job text fragments that instruct the job how to apply the rules and standards. The job controller 240 auto-generates a job 246 from these text fragments for each rule and/or scheme found in the term. This capability for auto-generating jobs based on the information contained in the glossary can be a time saver for users because the information that is shared across multiple users in a system is leveraged to create the right set of jobs to manage the data. Also the auto-generation feature can save users from having to manually build every job themselves.

Figure 12:
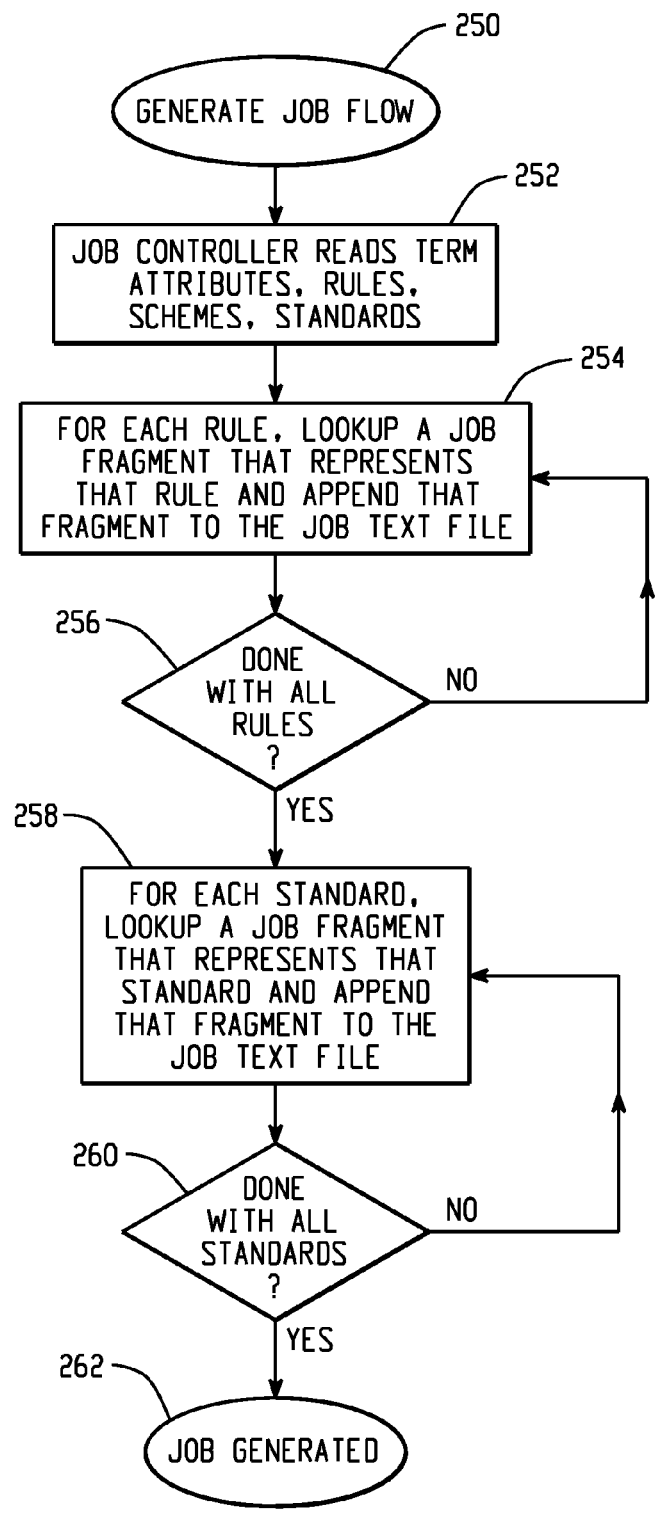
FIG. 12 is a process flow diagram depicting an example job generating process.

Depicted in FIG. 12 is a flow diagram further illustrating an example job generating process. To generate job flow (250), the job controller reads term attributes, rules, schemes, standards, etc. (Step 252). For each rule, the job controller looks up a job fragment that represents that rule and appends that fragment to the job text file (Step 254). A decision is made by the job controller regarding whether it is done with all rules (Step 256). If all of the rules have been incorporated then for each standard, the job controller looks up a job fragment that represents that standard and appends that fragment to the job text file (Step 258). A decision is made by the job controller regarding whether it is done with all standards (Step 260). If all standards have been incorporated, then the job has been generated (Step 262).

Figure 13:
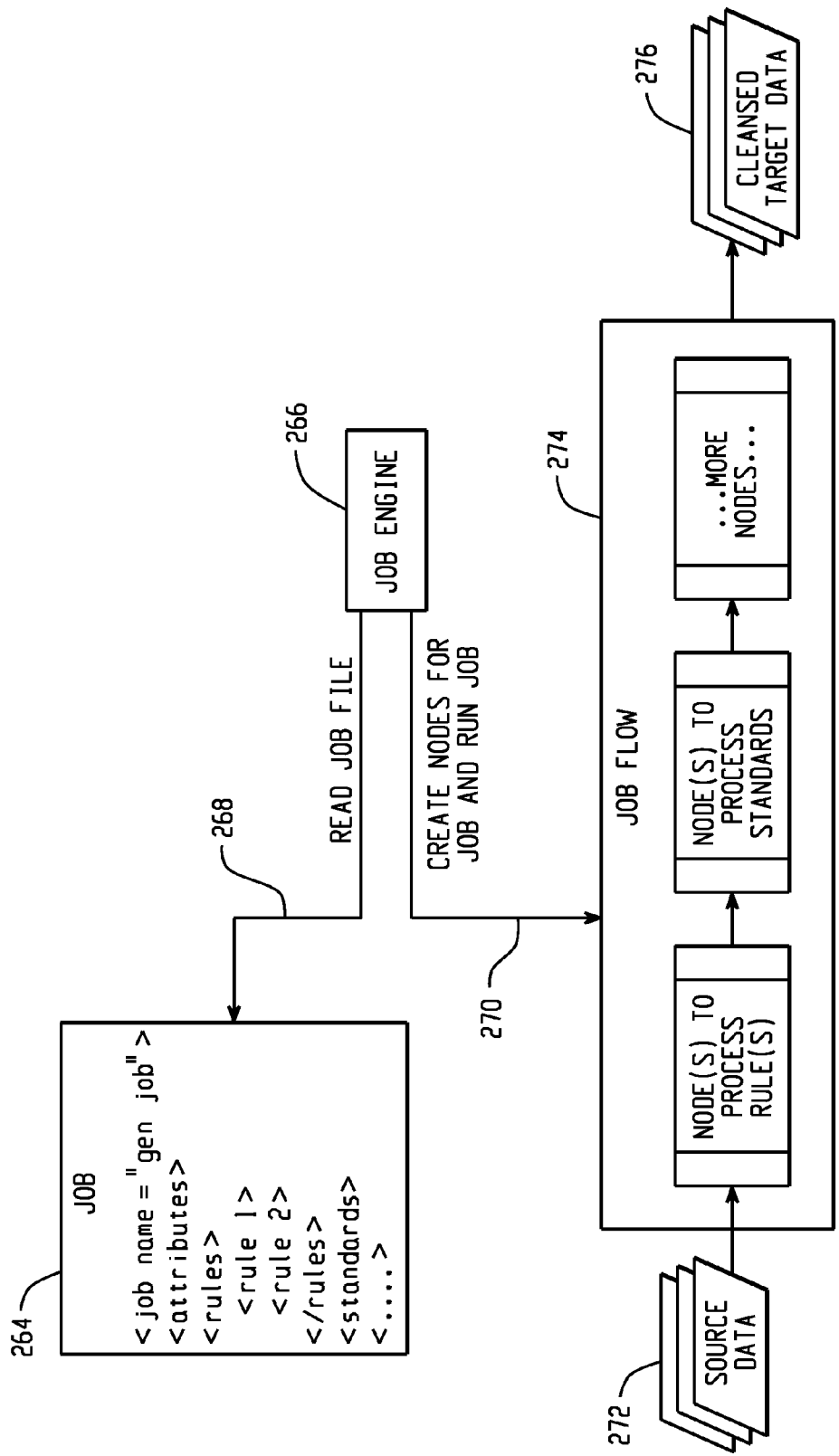
FIG. 13 is a process flow diagram depicting an example process for cleansing data.

A next step after a job is generated is to apply data to the job so that the data can be cleansed. Depicted in FIG. 13 is a flow diagram illustrating an example process for cleansing data. As shown in the figure, a job 264 can be a text file that can be read by the job engine 266 which contains a library of job nodes. The job engine 266 reads each node out of the job text file (Step 268), and instantiates job flow nodes (Step 270) to perform the steps outlined in the job. As a result, source data can enter the job flow process (274), which has a plurality of nodes to process rules and standards, to generate cleansed data (276).

Figure 14:
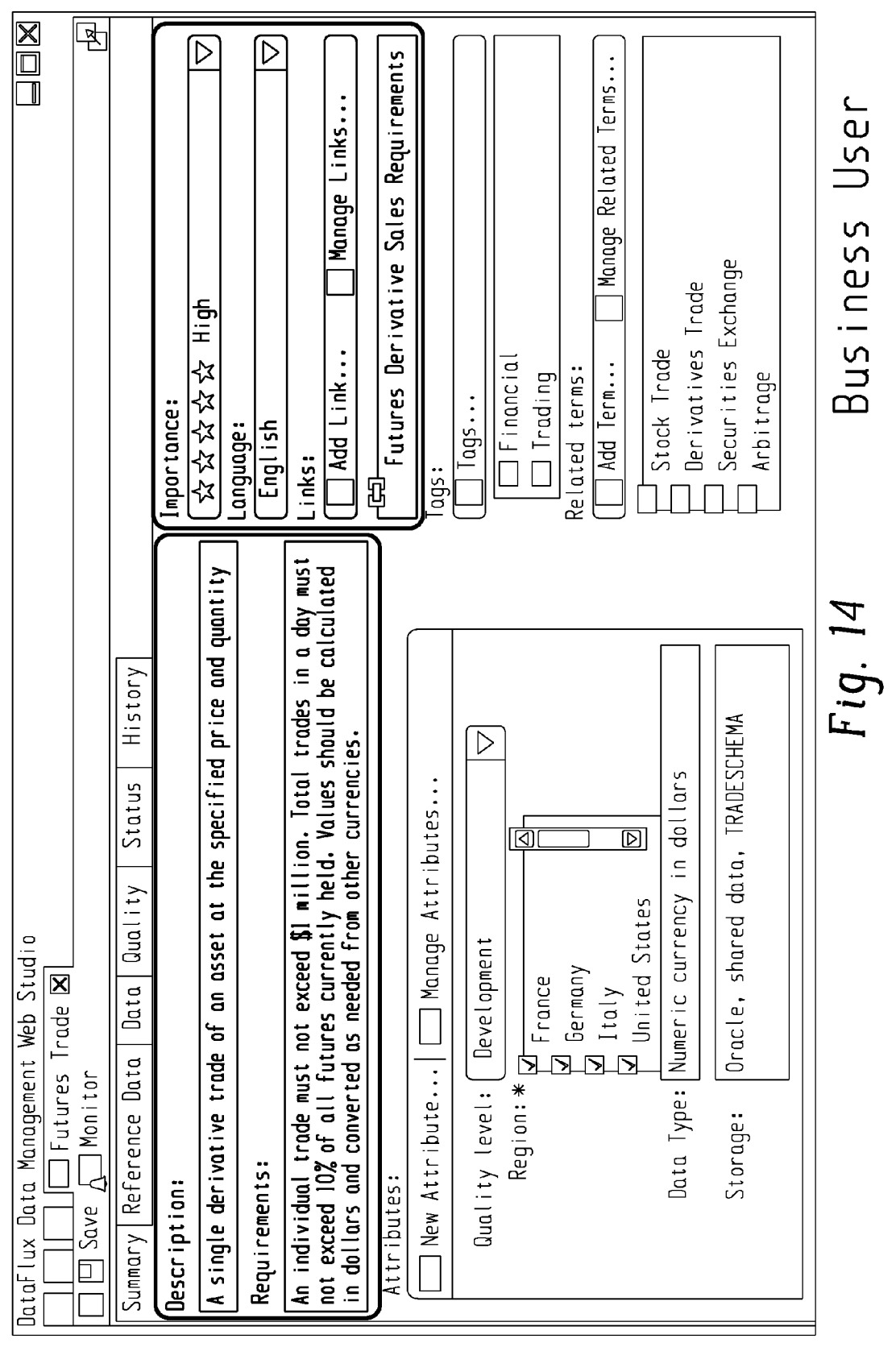

The glossary includes a plurality of user interfaces that are customized to meet the needs of specific user personas. Depicted in FIG. 14 is an example illustration of the components of the user interface associated with information stored in a glossary term that are tailored to the business user. In this example, the business user is responsible for adding terms that describe the business and adding general requirements associated with the term. The business user is also responsible for indicating how important this term is to the business, the native language associated with the term, and adding any supporting documents or links to other information which can be used to describe the term.

Figure 15:
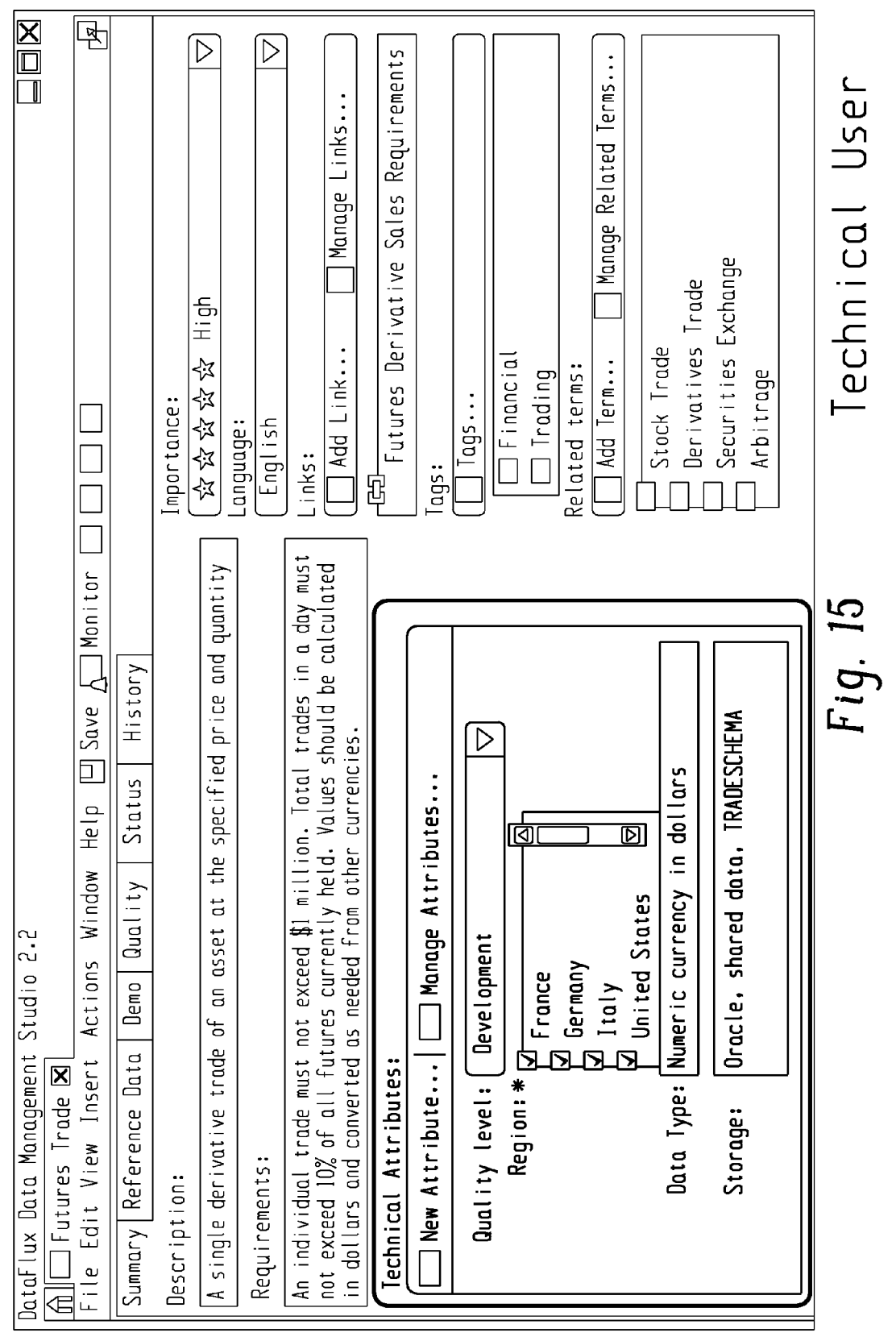

Depicted in FIG. 15 is an example illustration of the components of the user interface of the glossary which the technical user would fill in or leverage. The technical user would leverage the information supplied by the business user to determine the more technical details associated with a term. The technical user would also be responsible for filling in some of the attributes of the term and associating data, writing rules or code to further define and implement the term when it is associated with data, and other technical details.

Technical users can use this information to collaborate with other technical users. For example a technical user in one location might see the information stored for a term being used by another location. They may have similar needs for data associated with terms at their own location, and can use the information stored in the glossary for their own business and technical needs. They might copy the information out, or share their own information so that other technical users can see the rules or code they have created.

Figure 16:
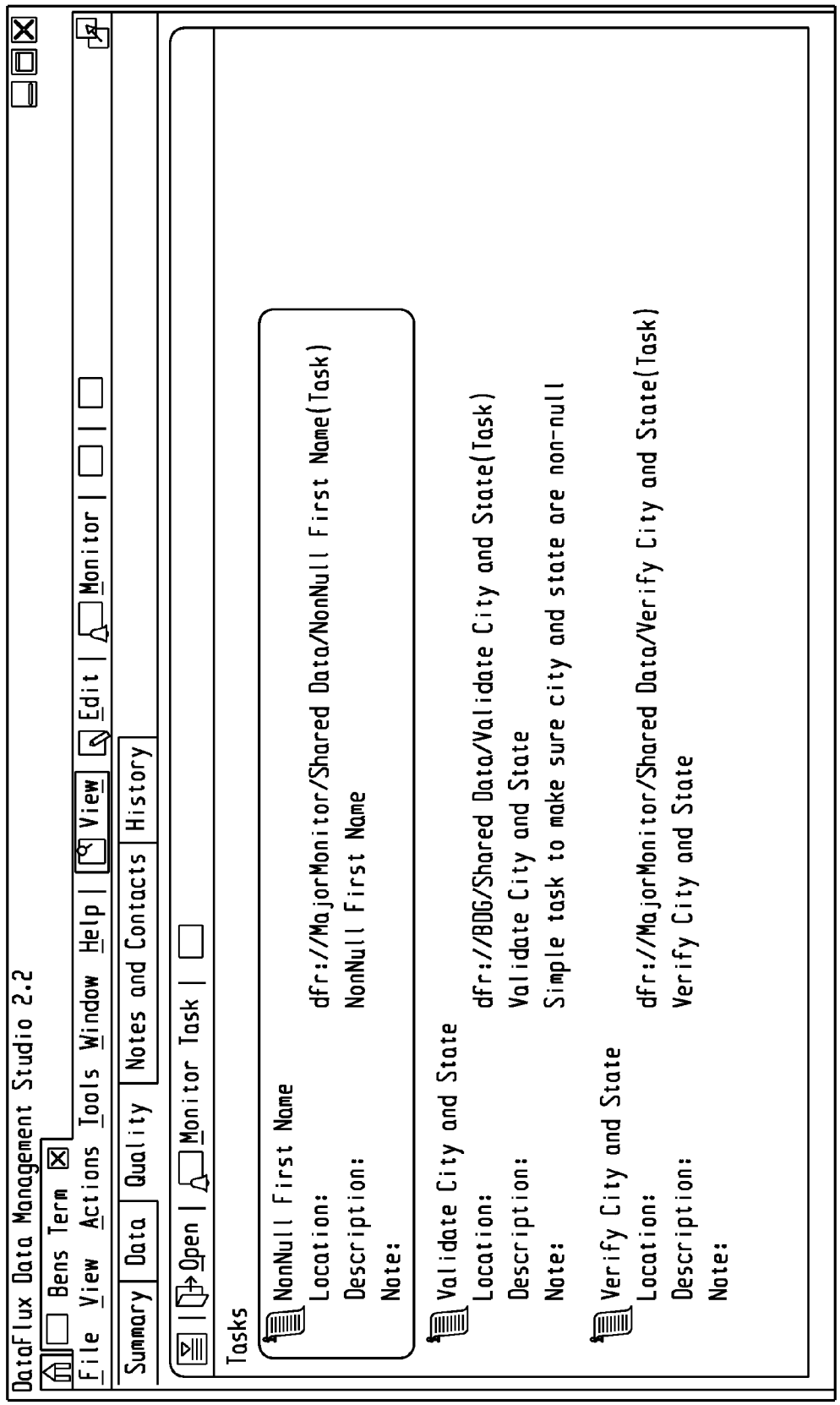
FIG. 16 is a diagram depicting an example of additional user interfaces available to a technical user.

Depicted in FIG. 16 is an example of some additional technical user interfaces available to technical users. In this example, the quality tab is displayed. It allows the technical user to associated job scripts that can be used to cleanse data associated to the term and can be used in job generation. The technical user can also associate rules that can be applied to data associated to the term and can document where particular physical components such as job scripts and rules actually exist. This allows the technical user to retain and store information about the physical pieces associated with the business term.

Figure 17:
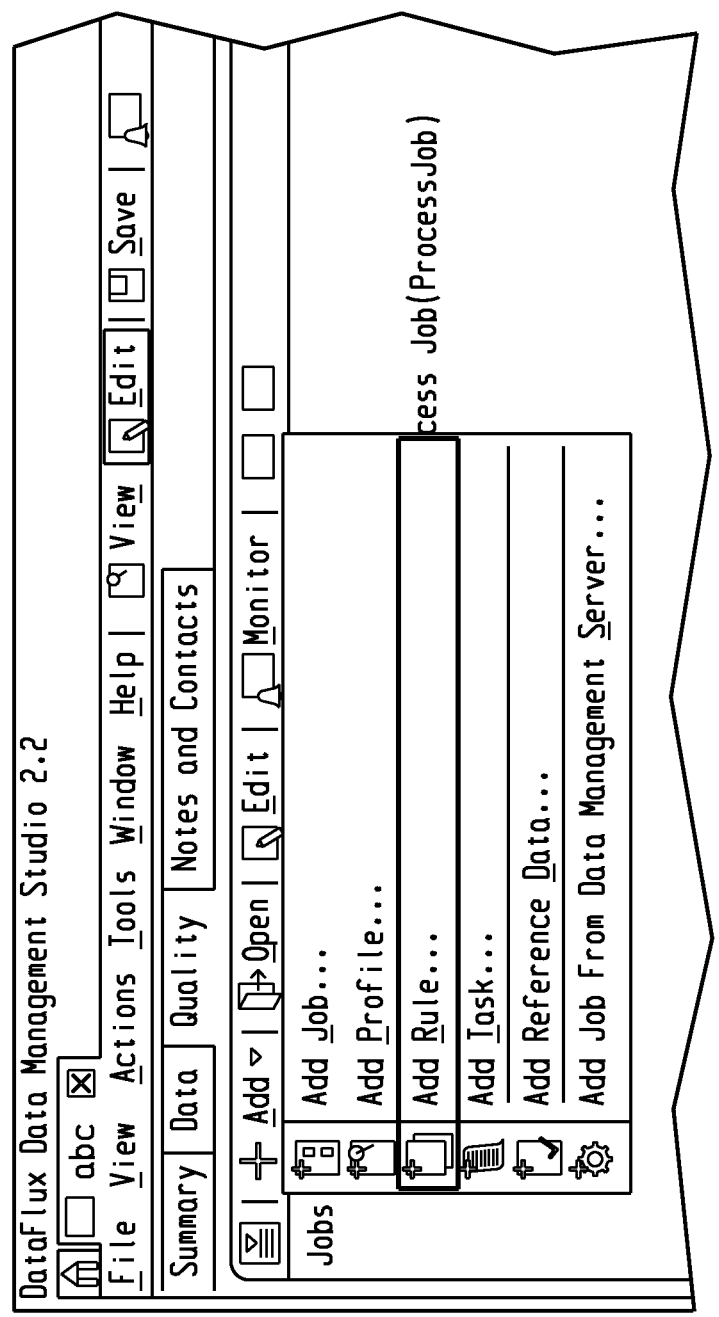
FIG. 17 is a diagram depicting an example list of the types of physical objects that a technical user can associate to a term.

Depicted in FIG. 17 is an example list of the types of physical objects that a technical user can associate to a term. Shown in this example is a menu for adding a job, a profile, a rule, a task, or reference data.

Figure 18A:
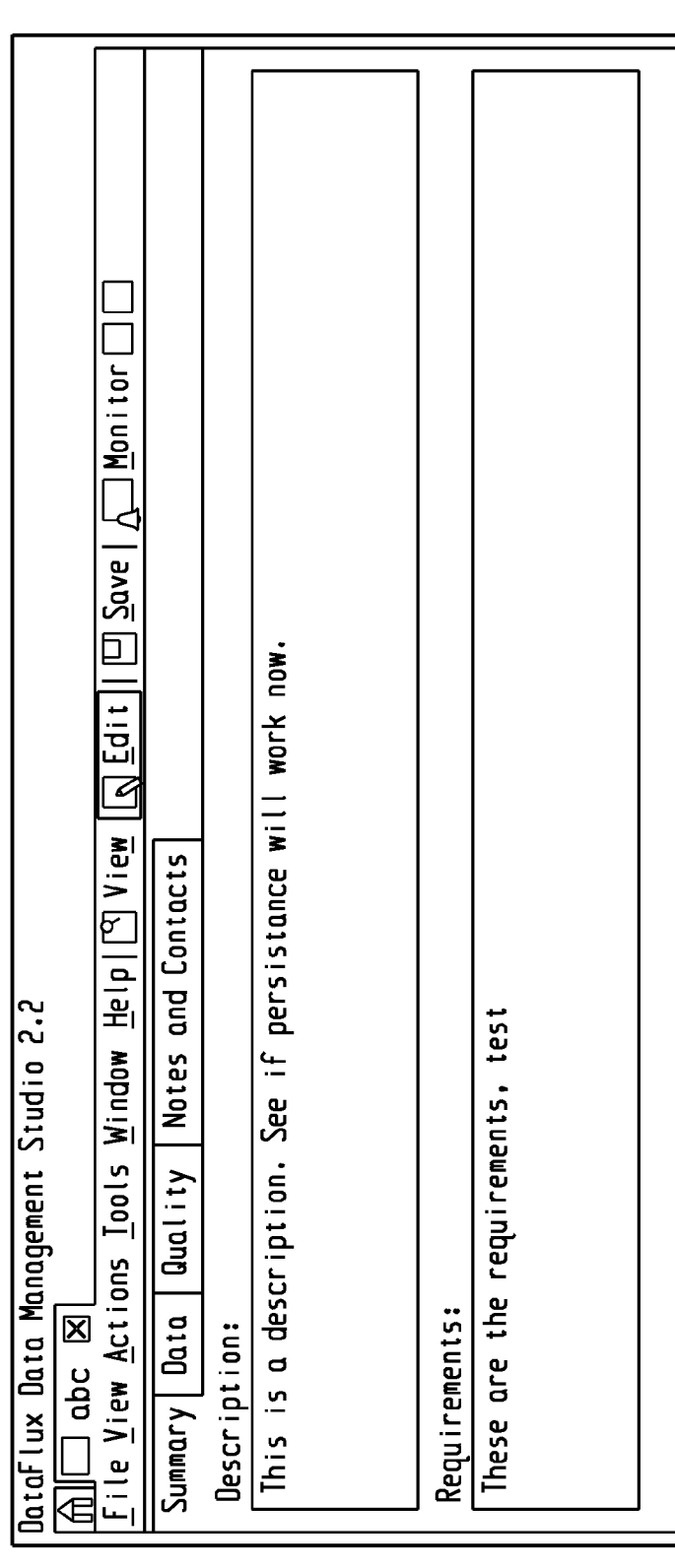

Provided in FIGS. 18A and 18B is an example template of physical information that a technical user can add to terms. This template can be used to remind users of the type of information that is required in a system or to capture specific useful information about a term that a site or company wants to have stored. The template can contain a mixture of business information and technical information wherein a business user could provide some of the information and a technical user could provide the remaining physical information.

Figure 19:
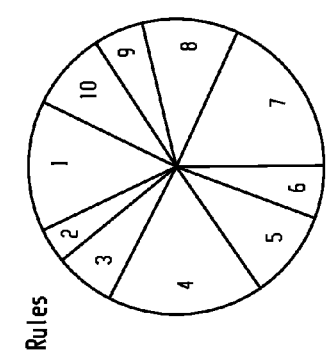
FIG. 19 is a diagram depicting an example of a user interface in the glossary for a data steward.

Depicted in FIG. 19 is an example user interface for a data steward. The information in this user interface allows the data steward to monitor and understand how the data in its system is performing relative to the data rules set up for the enterprise. The data steward can view how data related to a specific business term is performing and can view the data by business term. If there are questions regarding what the data is supposed to resemble or how it is to perform a data steward can answer those questions based on the information stored in the glossary and provided by the user interface. The user interface can also allow the data steward to correct errors that are found in the data. In addition, the user interface is customizable to display graphics and other information by related term to help the data steward understand and manage the underlying data.

The information contained in the glossary is interconnected and can be used to visualize how the terms, data, and related processes in a business are interrelated. Lineage views are provided that show how the objects that are related to glossary terms are interrelated. Glossary terms can also be related to other glossary terms which allow users to visualize how the information and data in their business processes are interrelated. This also allows users to see where they may be able to reuse content such as jobs or rules, to see where there may be redundancy in their data, and ensure that data is meeting the needs of related terms.

Figure 20:
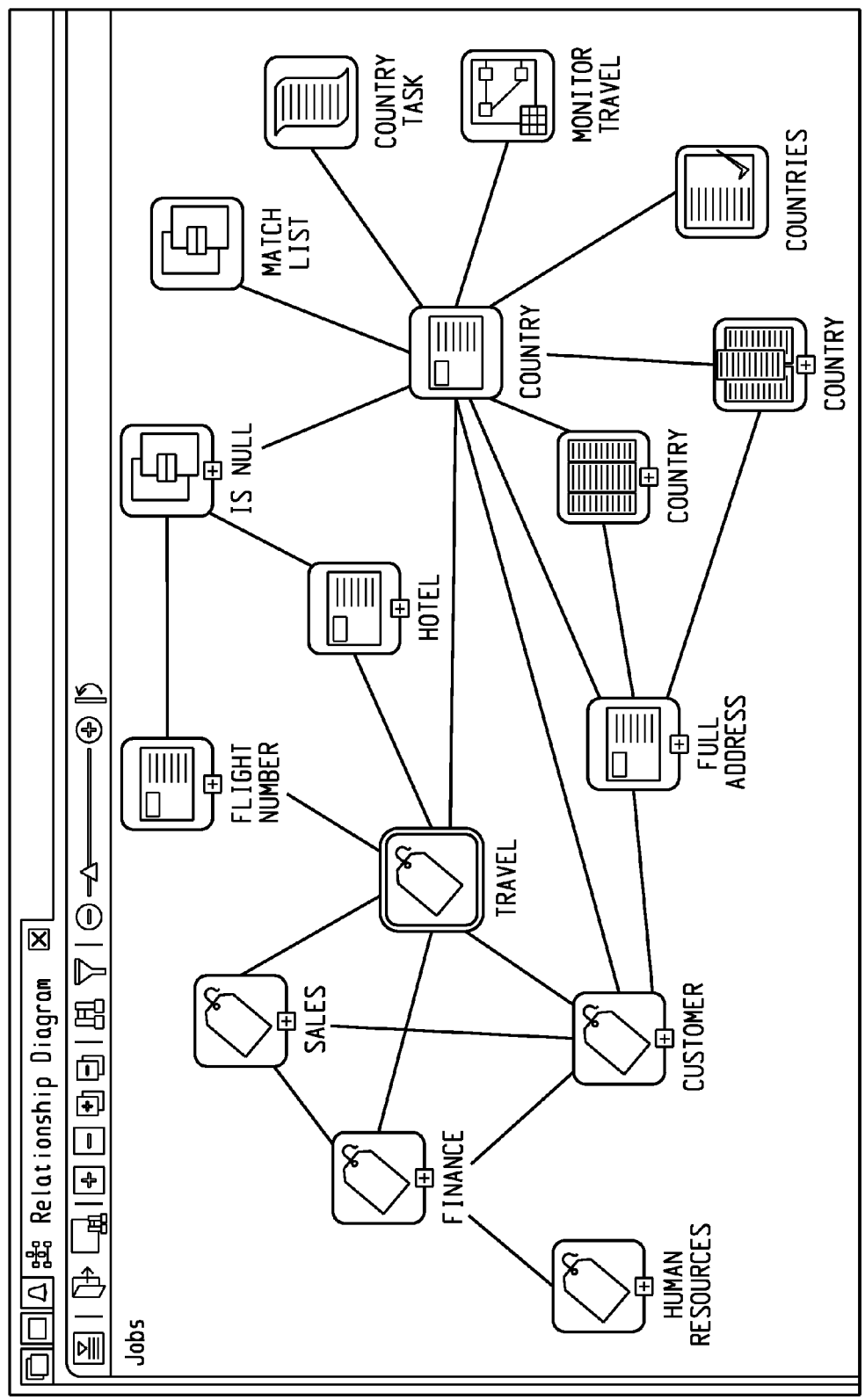
FIG. 20 is a diagram depicting an example visualization provided by the user interface for showing interrelationships between terms.

Depicted in FIG. 20 is an example visualization provided by the glossary user interface for showing interrelationships between terms. This example is a network graph that illustrates lineage views and relationships between terms in a glossary and their associated objects and attributes. This view provides an at-a-glance overview of all of the terms and related components in a business. This view also illustrates that the glossary stores the relationships between rules, data, and terms and can visualize that information for users to better understand their system.

Figure 21:
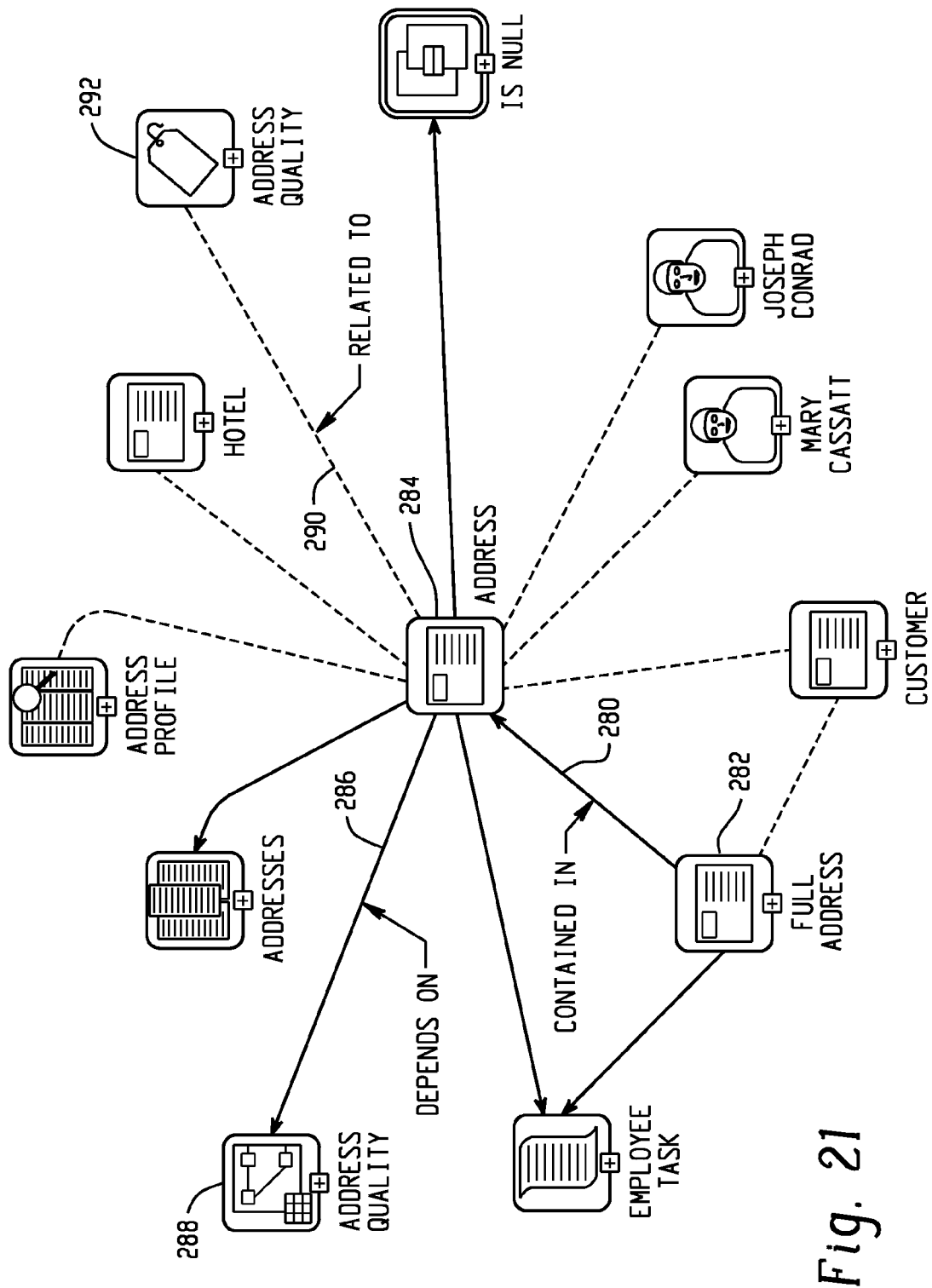
FIG. 21 is a diagram depicting an example visualization of a grouping mechanism available in the glossary, called tags.

Depicted in FIG. 21 is another example visualization provided by the glossary user interface for showing interrelationships between terms. In this example visualization, three types of interrelationships are illustrated. A thick arrow 280 indicates a hierarchical or lineage relationship between a full address term 282 and an address term 284 wherein the full address term 282 is contained in (or a child of) the address term 284. A thin arrow 286 indicates that the address term 284 depends on the address quality rule 288. A hashed line 290 indicates that the address term 284 is related to the address quality tag 292. The use of symbols can assist a user in interpreting relationships.

Figure 22:
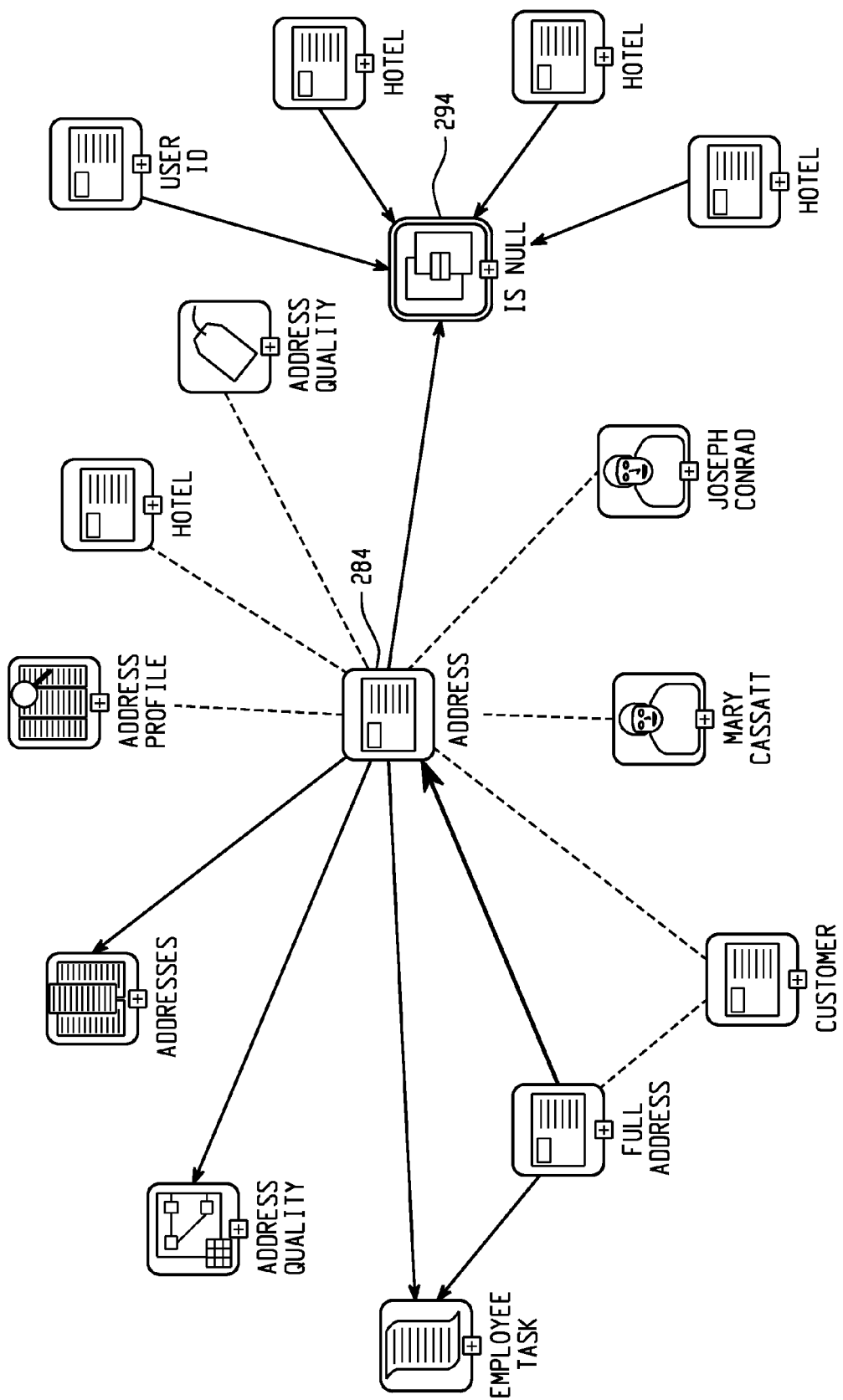
FIG. 22 is a diagram depicting an example visualization showing a number of business terms that depend on the Is NULL rule.

Depicted in FIG. 22 is an example visualization showing a number of business terms that depend on the Is NULL rule 294. When the Is NULL rule 294 is selected, additional business terms that depend on the Is NULL rule 294 are displayed.

Figure 23:
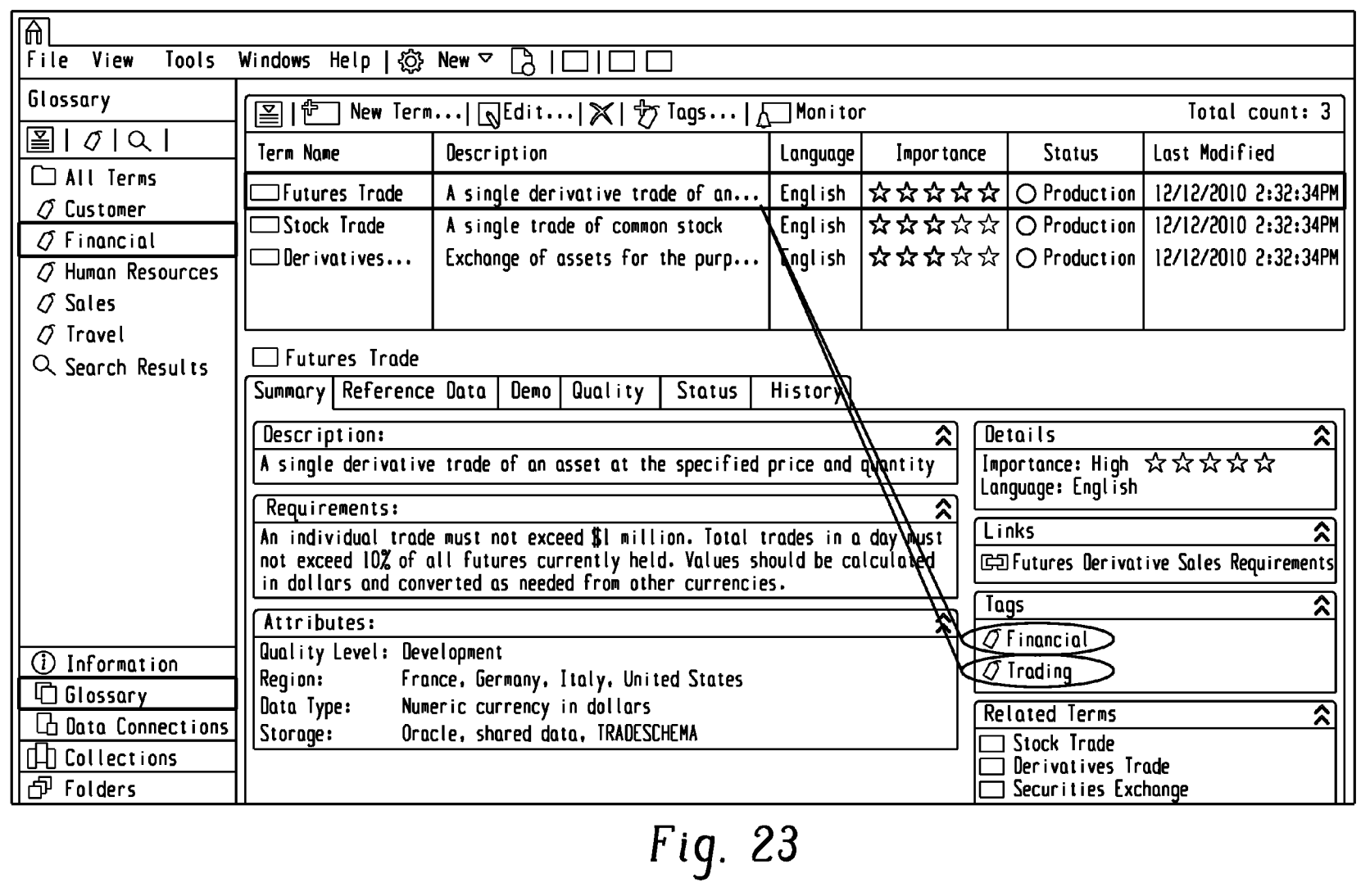

Depicted in FIG. 23 is an example visualization of a grouping mechanism available in the glossary, called tags. Glossary terms can be grouped by tags for the purposes of organizing the information in the glossary. Terms can be contained in multiple tags. For example a stock trade may have rules and requirements when it is used in both a financial transaction and in tax situations. By supporting multiple groupings in the glossary, terms that have requirements that span different areas can be shared across those different areas. This allows users to better qualify their terms and also understand and document how the terms interrelate.

Figure 24:
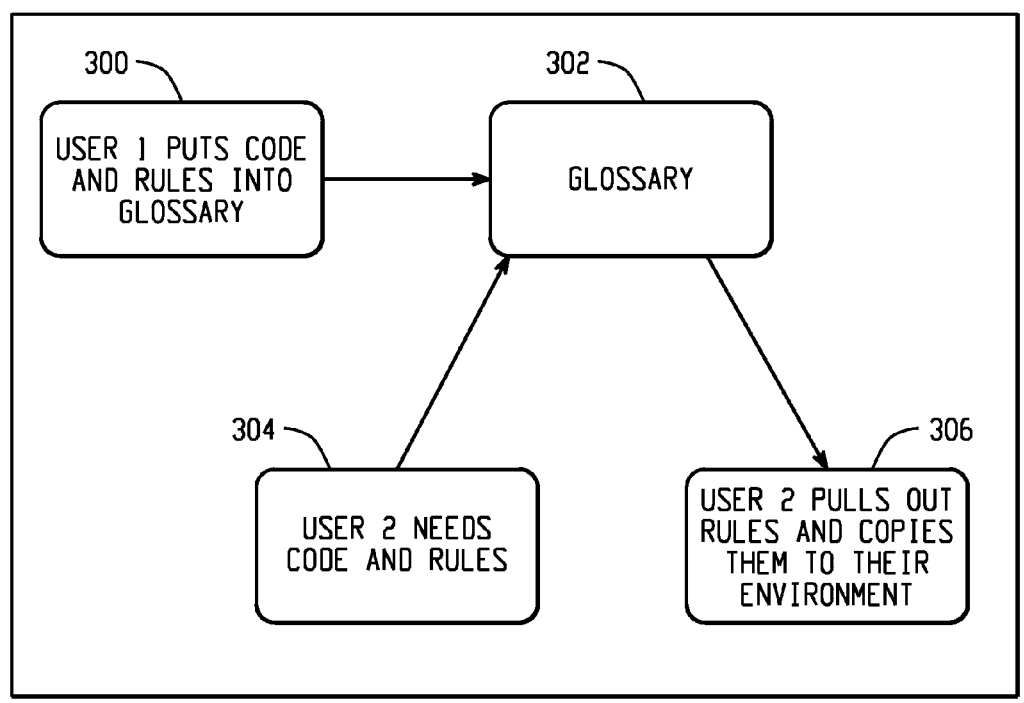
FIG. 24 is a process flow diagram depicting an example workflow exchange between two technical users.

The glossary can be useful as a collaboration mechanism between users and different user roles. Depicted in FIG. 24 is an illustration of an example workflow exchange between two technical users. Because the glossary stores the rules associated with terms, technical users can view that information and share those rules between their environments as needed. As illustrated, technical user 1 places rules associated with a term (300) into the glossary (302). Technical user 2 can then view that information (304) and copy or use that information for its own terms (306).

Figure 25:
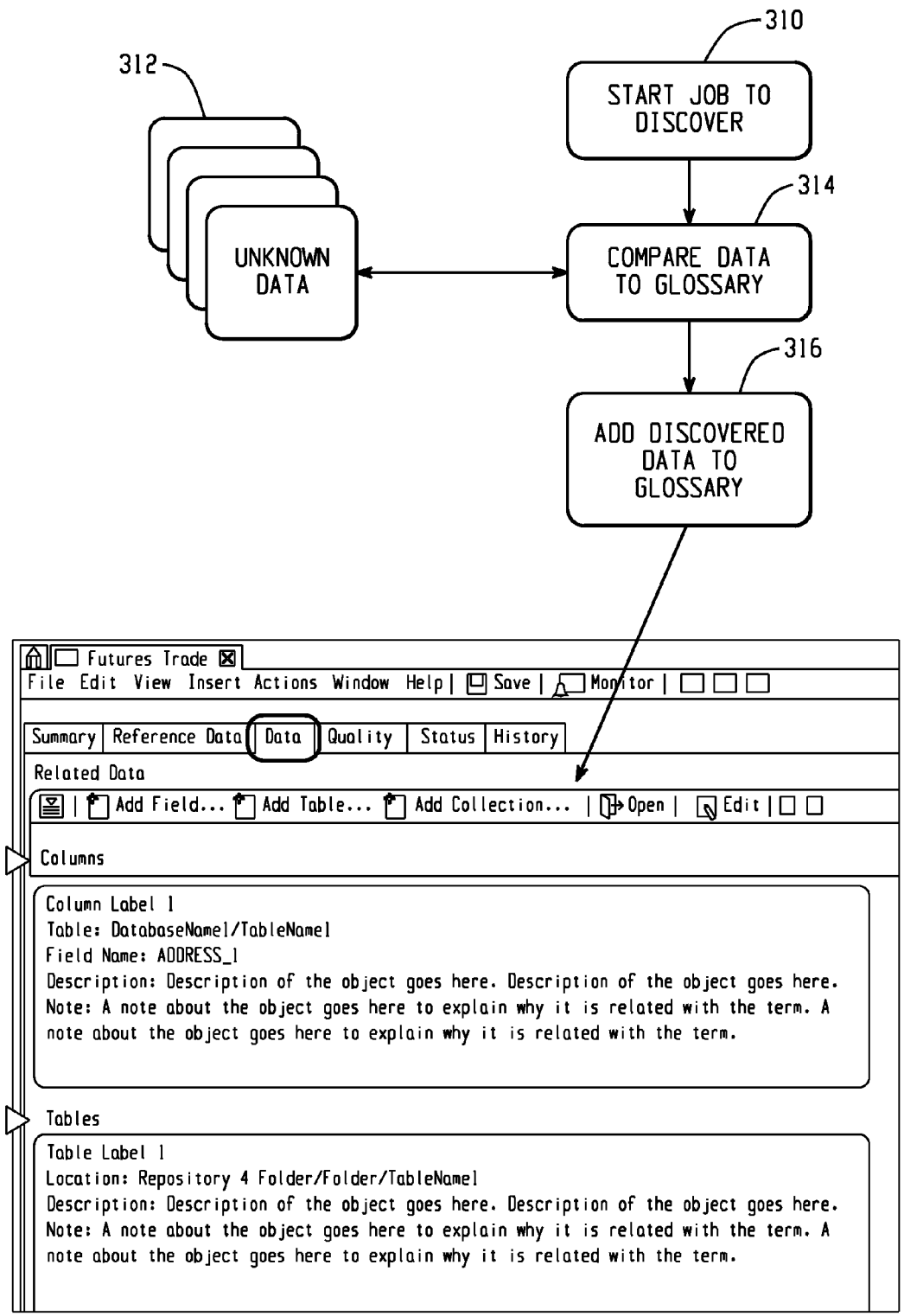
FIG. 25 is a process flow diagram depicting an example workflow diagram that illustrates that the glossary terms can be used to discover other content in an enterprise.

The information contained in the glossary can also be used to discover additional related documentation, jobs, and data in a system. Depicted in FIG. 25 is an example workflow diagram that illustrates the glossary terms can be used to discover other content in an enterprise. In the illustrated example, a job is commenced (310) to discover additional related data in a system. Unknown data (312) is compared to various glossary terms (314). Based on the information associated to the glossary terms, some of the unknown data can be determined to be associated with one or more glossary terms. This discovered data can be added to the glossary (316).

Depicted in FIG. 26 is a diagram that illustrates the lookup application layer interface into the glossary that is provided by the glossary architecture. The lookup application layer interface is a method that the glossary provides for easy access into the glossary from other documents. This lookup interface can be called from an application such as a browser to quickly search for terms in the glossary and display the details of the term in the glossary interface when found.

Figure 27:
FIG. 27 is a diagram providing an example illustration of term hierarchies.

Depicted in FIG. 27 is a diagram providing an example illustration of term hierarchies. Term hierarchies allow the user to create a term as a parent term and add child terms to it. Additional terms can be added as children to those child terms, allowing a number of levels. As illustrated in FIG. 27, the parent term may represent a term that is made up of sub-terms. An example of this could be a customer address that is made up of sub-terms such as street address, city, and state etc.

The parent term could also represent a business unit such as finance or human resources. A term created under finance, as a child, may have the same name as a term under human resources. Because of the different contexts of the terms they may have a different meaning and therefore a different set of rules, etc. may be associated with them.

This written description uses examples to disclose the invention, including the best mode, and also to enable a person skilled in the art to make and use the invention. The patentable scope of the invention may include other examples.

For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method, comprising:

storing data in a computerized data storage system that facilitates collaborative data management, wherein collaborative data management includes performance of multiple data management tasks, each data management task associated with a different one of multiple classes of data management tasks, wherein each one of the classes of data management tasks is associated with a unique group of users having permission to perform the data management tasks of the one class;

activating, on a computing device, a definition interface for defining terms used to manage the data, wherein a term is applicable to the data, and wherein a term includes a definition or a requirement;

activating an instruction interface for effectuating terms, wherein the instruction interface facilitates an input of instructions into a data management system such that the inputted instructions effectuate a defined term within the data storage system, and wherein the inputted instructions cause the data storage system to associate the data with the defined term effectuated by the inputted instructions;

processing the data according to the defined term effectuated by the inputted instructions; and displaying the inputted instructions, the defined term effectuated by the inputted instructions, and the processed data, wherein displaying includes using a monitoring interface that facilitates monitoring the data stored in the computerized data storage system.

2. The method of claim 1, wherein the instruction interface facilitates the input of instructions through code or instructions.

3. The method of claim 1, wherein collaborative data management further includes sharing information between the unique groups of users.

4. The method of claim 3, wherein collaborative data management further includes monitoring data for conformance with established rules.

5. The method of claim 1, further comprising:
activating a glossary configured to store defined terms used to manage the data.

6. The method of claim 5, wherein the glossary is accessible through both the definition interface and the instruction interface.

7. The method of claim 6, wherein the glossary is further configured to facilitate sharing of information between different users, each of the different users belonging to a different one of the groups of users.

8. The method of claim 1, wherein the data storage system further facilitates associating problems in the data with defined terms used within the data storage system.

9. The method of claim 1, wherein a term further includes an attribute, and wherein an attribute includes a name attribute, description attribute, or a requirement attribute.

10. The method of claim 1, wherein a term further includes an attribute, and wherein an attribute includes an importance attribute, a status attribute or an owners attribute.

11. The method of claim 1, wherein a term further includes an attribute, and wherein an attribute includes a related documents attribute.

12. The method of claim 1, wherein the definition interface is used to define business terms, wherein a business term includes a site specific template attribute, and wherein a site specific template attribute includes a multi-line text attribute entry type.

13. A system, comprising:
one or more processors;
one or more non-transitory computer-readable storage mediums containing instructions configured to cause the one or more processors to perform operations including:
storing data in a computerized data storage system that facilitates collaborative data management, wherein collaborative data management includes performance of multiple data management tasks, each data management task associated with a different one of multiple classes of data management tasks, wherein each one of the classes of data management tasks is associated with a unique group of users having permission to perform the data management tasks of the one class;
activating a definition interface for defining terms used to manage the data, wherein a term is applicable to the data, and wherein a term includes a definition or a requirement;
activating an instruction interface for effectuating terms, wherein the instruction interface facilitates an input of instructions into a data management system such that the inputted instructions effectuate a defined term within the data storage system, and wherein the inputted instructions cause the data storage system to associate the data with the defined term effectuated by the inputted instructions;
processing the data according to the defined term effectuated by the inputted instructions; and displaying the inputted instructions, the defined term effectuated by the inputted instructions, and the processed data, wherein displaying includes using a monitoring interface that facilitates monitoring the data stored in the data storage system.

14. The system of claim 13, wherein the instruction interface facilitates the input of instructions through code or instructions.

15. The system of claim 13, wherein collaborative data management further includes sharing information between the unique groups of users.

16. The system of claim 15, wherein collaborative data management further includes monitoring data for conformance with established rules.

17. The system of claim 13, wherein the operations further include:
activating a glossary configured to store defined terms used to manage the data.

18. The system of claim 17, wherein the glossary is accessible through both the definition interface and the instruction interface.

19. The system of claim 18, wherein the glossary is further configured to facilitate sharing of information between different users, each of the different users belonging to a different one of the groups of users.

20. The system of claim 13, wherein the data storage system further facilitates associating problems in the data with defined terms used within the data storage system.

21. The system of claim 13, wherein a term further includes an attribute, and wherein an attribute includes a name attribute, description attribute, or a requirement attribute.

22. The system of claim 13, wherein a term further includes an attribute, and wherein an attribute includes an importance attribute, a status attribute or an owners attribute.

23. The system of claim 13, wherein a term further includes an attribute, and wherein an attribute includes a related documents attribute.

24. The system of claim 13, wherein the definition interface is used to define business terms, wherein a business term includes a site specific template attribute, and wherein a site specific template attribute includes a multi-line text attribute entry type.

25. A computer-program product, tangibly embodied in a machine-readable non-transitory storage medium, including instructions executable to cause a data processing apparatus to perform operations including:
storing data in a computerized data storage system that facilitates collaborative data management, wherein collaborative data management includes performance of multiple data management tasks, each data management task associated with a different one of multiple classes of data management tasks, wherein each one of the classes of data management tasks is associated with a unique group of users having permission to perform the data management tasks of the one class;
activating a definition interface for defining terms used to manage the data, wherein a term is applicable to the data, and wherein a term includes a definition or a requirement;
activating an instruction interface for effectuating terms, wherein the instruction interface facilitates an input of instructions into a data management system such that the inputted instructions effectuate a defined term within the data storage system, and wherein the inputted instructions cause the data storage system to associate the data with the defined term effectuated by the inputted instructions;

processing the data according to the defined term effectuated by the inputted instructions; and displaying the inputted instructions, the defined term effectuated by the inputted instructions, and the processed data, wherein displaying includes using a monitoring interface that facilitates monitoring the data stored in the data storage system.

26. The computer-program product of claim 25, wherein the instruction interface facilitates the input of instructions through code or instructions.

27. The computer-program product of claim 25, wherein collaborative data management further includes sharing information between the unique groups of users.

28. The computer-program product of claim 27, wherein collaborative data management further includes monitoring data for conformance with established rules.

29. The computer-program product of claim 25, wherein the operations further include:

activating a glossary configured to store defined terms used to manage the data.

30. The computer-program product of claim 29, wherein the glossary is accessible through both the definition interface and the instruction interface.

31. The computer-program product of claim 30, wherein the glossary is further configured to facilitate sharing of information between different users, each of the different users belonging to a different one of the groups of users.

32. The computer-program product of claim 25, wherein the data storage system further facilitates associating problems in the data with defined terms used within the data storage system.

33. The computer-program product of claim 25, wherein a term further includes an attribute, and wherein an attribute includes a name attribute, description attribute, or a requirement attribute.

34. The computer-program product of claim 25, wherein a term further includes an attribute, and wherein an attribute includes an importance attribute, a status attribute or an owners attribute.

35. The computer-program product of claim 25, wherein a term further includes an attribute, and wherein an attribute includes a related documents attribute.

36. The computer-program product of claim 25, wherein the definition interface is used to define business terms, wherein a business term includes a site specific template attribute, and wherein a site specific template attribute includes a multi-line text attribute entry type.

* * * * *